(12) United States Patent
Minamisawa

(10) Patent No.: US 11,493,779 B2
(45) Date of Patent: Nov. 8, 2022

(54) OPTICAL UNIT WITH SHAKE CORRECTION FUNCTION

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 276 days.

(21) Appl. No.: 16/830,260

(22) Filed: Mar. 25, 2020

(65) Prior Publication Data

US 2020/0310152 A1 Oct. 1, 2020

(30) Foreign Application Priority Data

Mar. 28, 2019 (JP) .............................. JP2019-062236

(51) Int. Cl.
*G02B 27/64* (2006.01)
*G03B 5/00* (2021.01)
(Continued)

(52) U.S. Cl.
CPC ............. *G02B 27/646* (2013.01); *G03B 5/00* (2013.01); *H02K 11/215* (2016.01);
(Continued)

(58) Field of Classification Search
CPC ........ G02B 27/64; G02B 27/646; G02B 7/09; G02B 13/001; G03B 5/00;
(Continued)

(56) References Cited

U.S. PATENT DOCUMENTS 7,742,692 B2 6/2010 Omi
9,527,161 B2 12/2016 Watanabe et al.
(Continued)

FOREIGN PATENT DOCUMENTS

CN 101162345 4/2008
CN 101162347 4/2008
(Continued)

OTHER PUBLICATIONS

Office Action of China Counterpart Application, with English translation thereof, dated May 31, 2021, pp. 1-13.

*Primary Examiner* — Marin Pichler
(74) *Attorney, Agent, or Firm* — JCIPRNET

(57) ABSTRACT

An optical unit with a shake correction function includes a movable body, a gimbal mechanism, a fixed body and a magnetic drive mechanism. The gimbal mechanism includes a gimbal frame, a first connection mechanism turnably connecting the movable body with the gimbal frame around a first axis, and a second connection mechanism turnably connecting the fixed body with the gimbal frame around a second axis. The first connection mechanism includes a first spherical body, a first spherical body fixing part to which the first spherical body is fixed in one of the movable body and the gimbal frame and, in the other, a first spherical body support part having a first concave curved face which faces the first spherical body fixing part and contacts with the first spherical body, and the first spherical body fixing part has a first fixing hole to which the first spherical body is partly fitted.

7 Claims, 12 Drawing Sheets

(51) Int. Cl.
*H02K 11/215* (2016.01)
*H02K 41/035* (2006.01)

(52) U.S. Cl.
CPC . *H02K 41/0356* (2013.01); *G03B 2205/0007* (2013.01); *G03B 2205/0053* (2013.01)

(58) Field of Classification Search
CPC .... G03B 2205/0007; G03B 2205/0053; G03B 2205/0015; G03B 2205/0069; G03B 5/02; G03B 5/06; G03B 30/00; H02K 11/215; H02K 41/0356; H02K 41/0358; H02K 2201/18
USPC ................................. 359/554, 557; 348/208
See application file for complete search history.

(56) References Cited

U.S. PATENT DOCUMENTS

| | | | |
|---|---|---|---|
| 10,057,474 | B2 | 8/2018 | Minamisawa et al. |
| 10,185,156 | B2 | 1/2019 | Minamisawa et al. |
| 10,884,215 | B2 | 1/2021 | Kuo et al. |
| 10,976,640 | B2 | 4/2021 | Minamisawa et al. |
| 2016/0161756 | A1 | 6/2016 | Liu et al. |
| 2016/0170229 | A1 | 6/2016 | Park et al. |
| 2017/0003517 | A1* | 1/2017 | Sue .................... H02K 41/0356 |

FOREIGN PATENT DOCUMENTS

| | | |
|---|---|---|
| CN | 204462604 | 7/2015 |
| CN | 105081572 | 11/2015 |
| CN | 205679838 | 11/2016 |
| CN | 107092066 | 8/2017 |
| CN | 107526229 | 12/2017 |
| CN | 108693680 | 10/2018 |
| JP | H0933974 | 2/1997 |
| JP | 2007096830 | 4/2007 |
| JP | 2014006522 | 1/2014 |
| JP | 2017198727 | 11/2017 |

* cited by examiner

OPTICAL UNIT WITH SHAKE CORRECTION FUNCTION

CROSS REFERENCE TO RELATED APPLICATION

The present application claims priority under 35 U.S.C. § 119 to Japanese Application No. 2019-062236 filed on Mar. 28, 2019, and the entire content of which is incorporated herein by reference.

TECHNICAL FIELD

The present disclosure relates to an optical unit with a shake correction function structured to perform a shake correction of an optical module.

BACKGROUND

An optical unit which is mounted on a portable terminal or a movement body may include a mechanism structured to swing or turn a movable body on which an optical module is mounted around a predetermined axis to correct a shake in order to restrain disturbance of a photographed image of the portable terminal or when the movement body is moved. Such an optical unit with a shake correction function is disclosed in Japanese Patent Laid-Open No. 2014-006522 (Patent Literature 1).

The optical unit with a shake correction function described in Patent Literature 1 includes a gimbal mechanism structured to swingably support a movable body around a predetermined axis. The gimbal mechanism includes a gimbal frame (movable frame) in a rectangular frame shape and a connection mechanism structured to turnably connect the gimbal frame with the movable body around the axis. The connection mechanism includes spherical bodies, spherical body fixing parts to each of which the spherical body is fixed, and spherical body support parts each of which is provided with a hemispherical shaped recessed part with which the spherical body is contacted. The spherical body fixing parts are inner side faces of a pair of corner parts of the gimbal frame which face each other in a predetermined axial line direction. The spherical body is fixed to the inner side face of each corner part by welding. The spherical body support part is provided at two positions of the movable body which face each spherical body fixing part in a predetermined axial line direction.

In order to reduce a size of an optical unit with a correction function, the size of the connection mechanism is required to be made small. However, when a size of the spherical body is made small for reducing a size of the connection mechanism, it is difficult to fix the spherical body in a positioned state on an inner side of a corner part of the gimbal frame. If the spherical body is not positioned, it is difficult to support the movable body by the gimbal frame with a high degree of accuracy.

The present disclosure provides an optical unit with a shake correction function in which, when a gimbal frame and a movable body are to be turnably connected with each other by using a spherical body, the spherical body is capable of being positioned and fixed with a high degree of accuracy.

SUMMARY

The present disclosure provides an optical unit with a shake correction function including a movable body having an optical module, a gimbal mechanism structured to swingably support the movable body around a first axis intersecting an optical axis and swingably support the movable body around a second axis intersecting the optical axis and the first axis, a fixed body which supports the movable body through the gimbal mechanism, and a magnetic drive mechanism structured to swing the movable body around the first axis and around the second axis. The gimbal mechanism includes a gimbal frame, a first connection mechanism structured to turnably connect the movable body with the gimbal frame around the first axis, and a second connection mechanism structured to turnably connect the fixed body with the gimbal frame around the second axis. The first connection mechanism includes a first spherical body, a first spherical body fixing part to which the first spherical body is fixed in one of the movable body and the gimbal frame, and a first spherical body support part having a first concave curved face which faces the first spherical body fixing part and contacts with the first spherical body in the other of the movable body and the gimbal frame, and the first spherical body fixing part is provided with a first fixing hole to which the first spherical body is partly fitted.

Other features and advantages of the disclosure will be apparent from the following detailed description, taken in conjunction with the accompanying drawings that illustrate, by way of example, various features of embodiments of the disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

Figure 9:
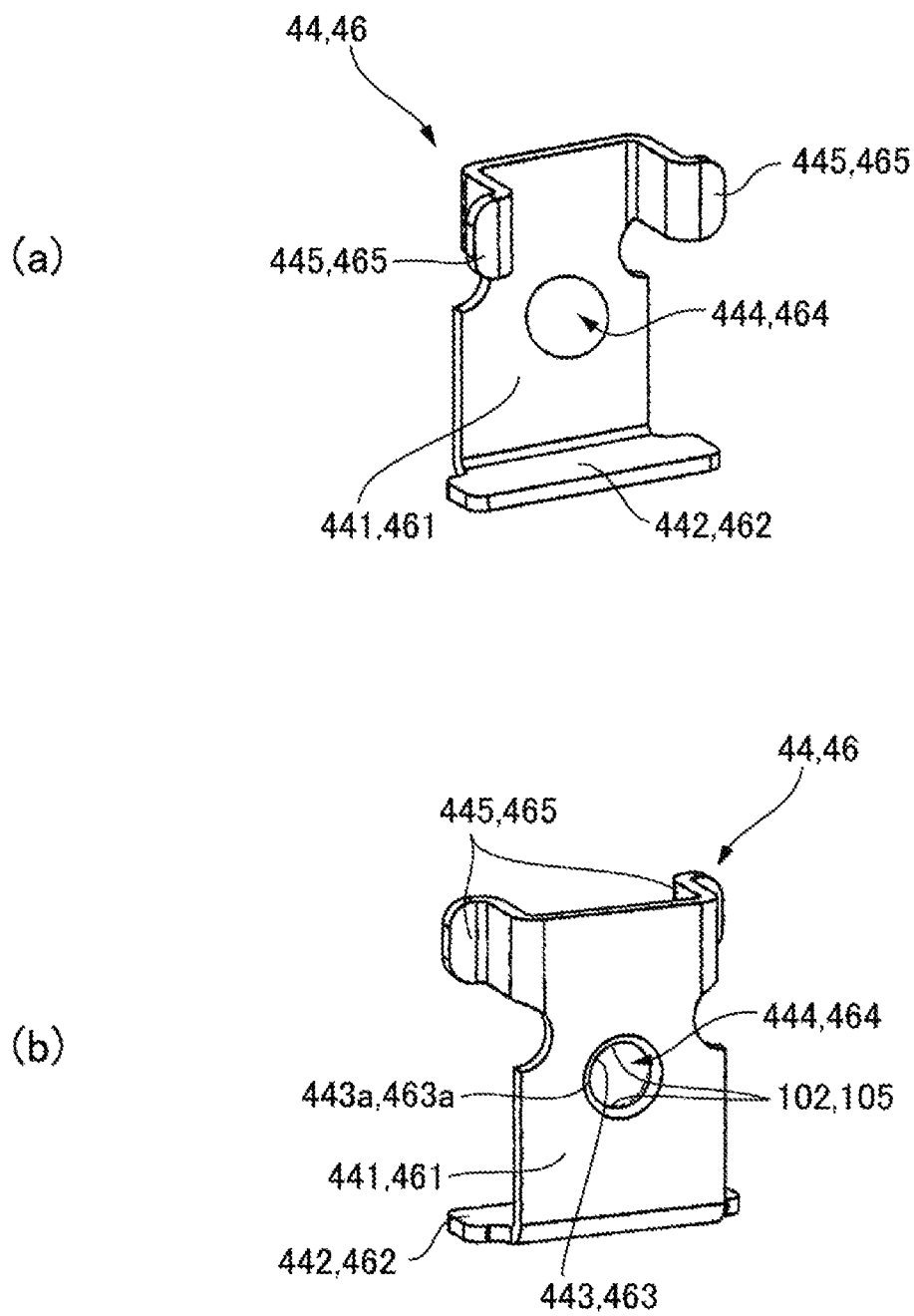

(a) and (b) of FIG. 9 are perspective views showing a first thrust receiving member and a second thrust receiving member.

Figure 10:
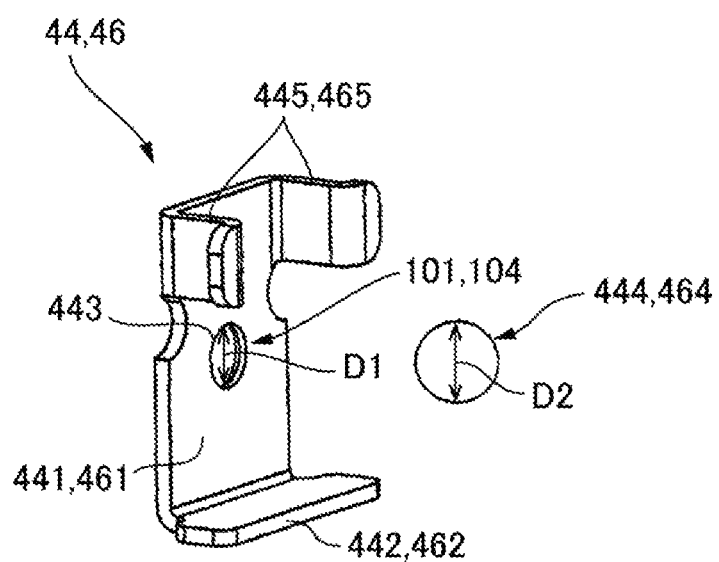

FIG. 10 is an exploded perspective view showing a first thrust receiving member and a second thrust receiving member.

Figure 11:
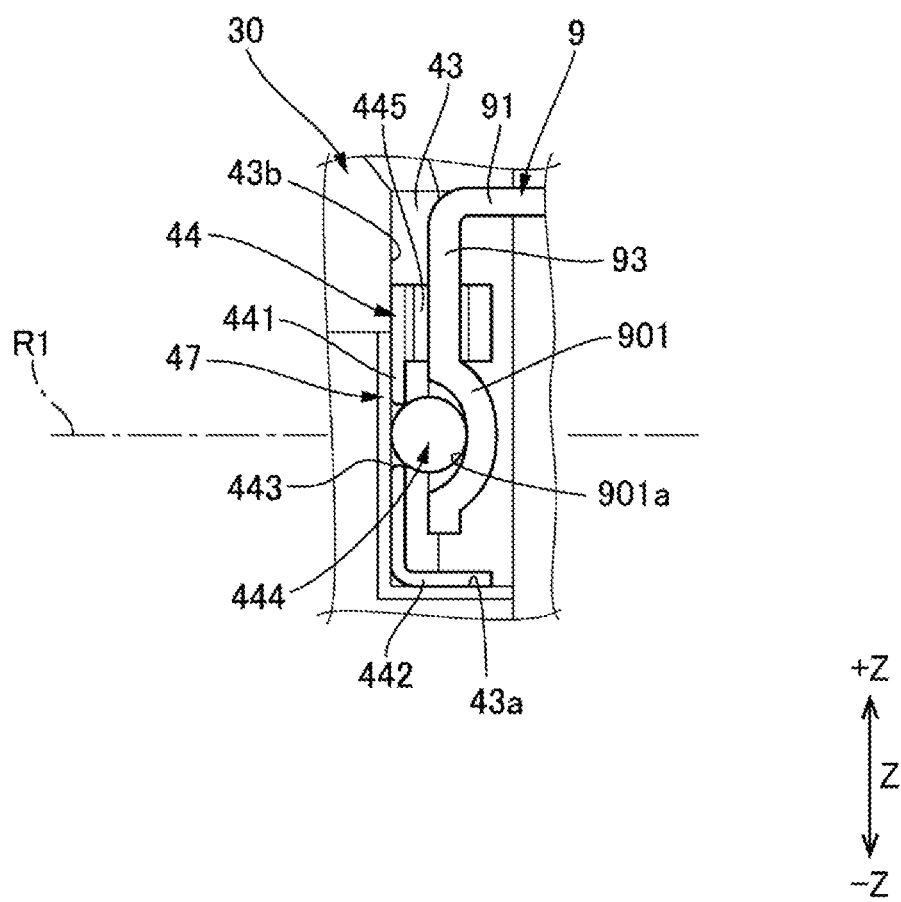

FIG. 11 is a cross-sectional view showing a first connection mechanism which is cut along a first axis "R1".

Figure 12:
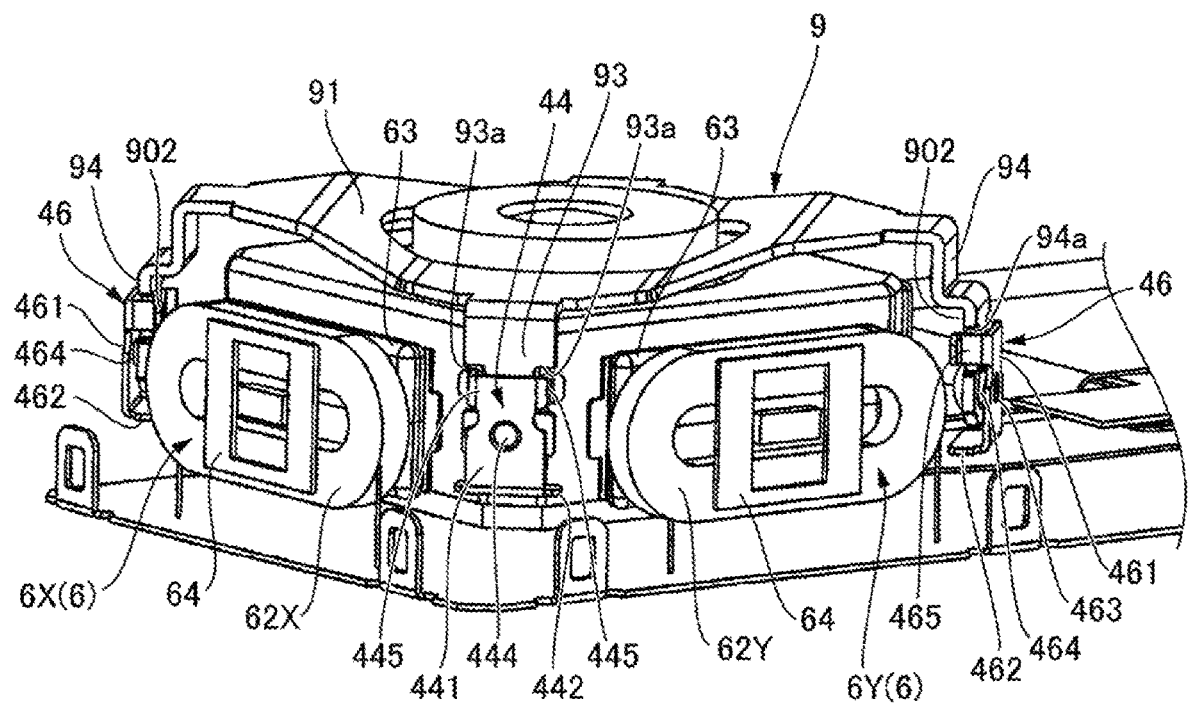
Figure 12:
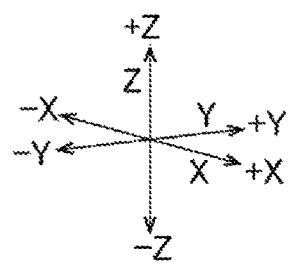

FIG. 12 is an explanatory view showing a first connection mechanism and a second connection mechanism.

DETAILED DESCRIPTION

An embodiment of an optical unit 1 with a shake correction function to which the present disclosure is applied will be described below with reference to the accompanying drawings. In the present specification, three axes of "X", "Y" and "Z" are axial line directions perpendicular to each other, and one side in the "X"-axis direction is indicated with "+X" and the other side is indicated with "−X", one side in the "Y"-axis direction is indicated with "+Y", the other side is indicated with "−Y", and one side in the "Z"-axis direction is indicated with "+Z" and the other side is indicated with "−Z". The "Z"-axis direction is coincided with an optical axis "L" direction of an optical module 2. Further, the "+Z" direction is one side (object side) in the optical axis "L" direction and the "−Z" direction is the other side (image side) in the optical axis "L" direction.

(Entire Structure)

Figure 1:
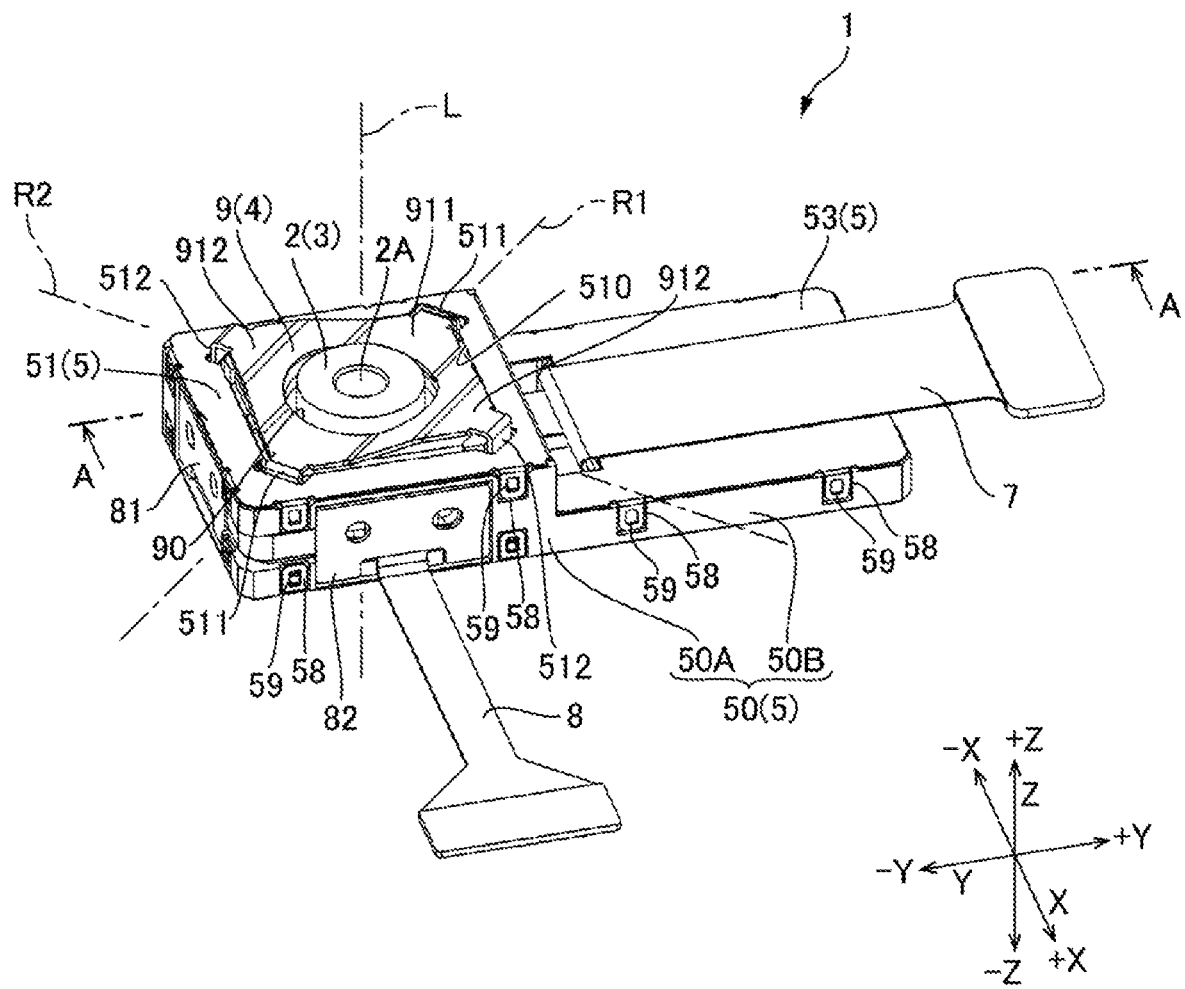
FIG. 1 is an outward perspective view showing an optical unit with a shake correction function in accordance with an embodiment of the present disclosure.
Figure 2:
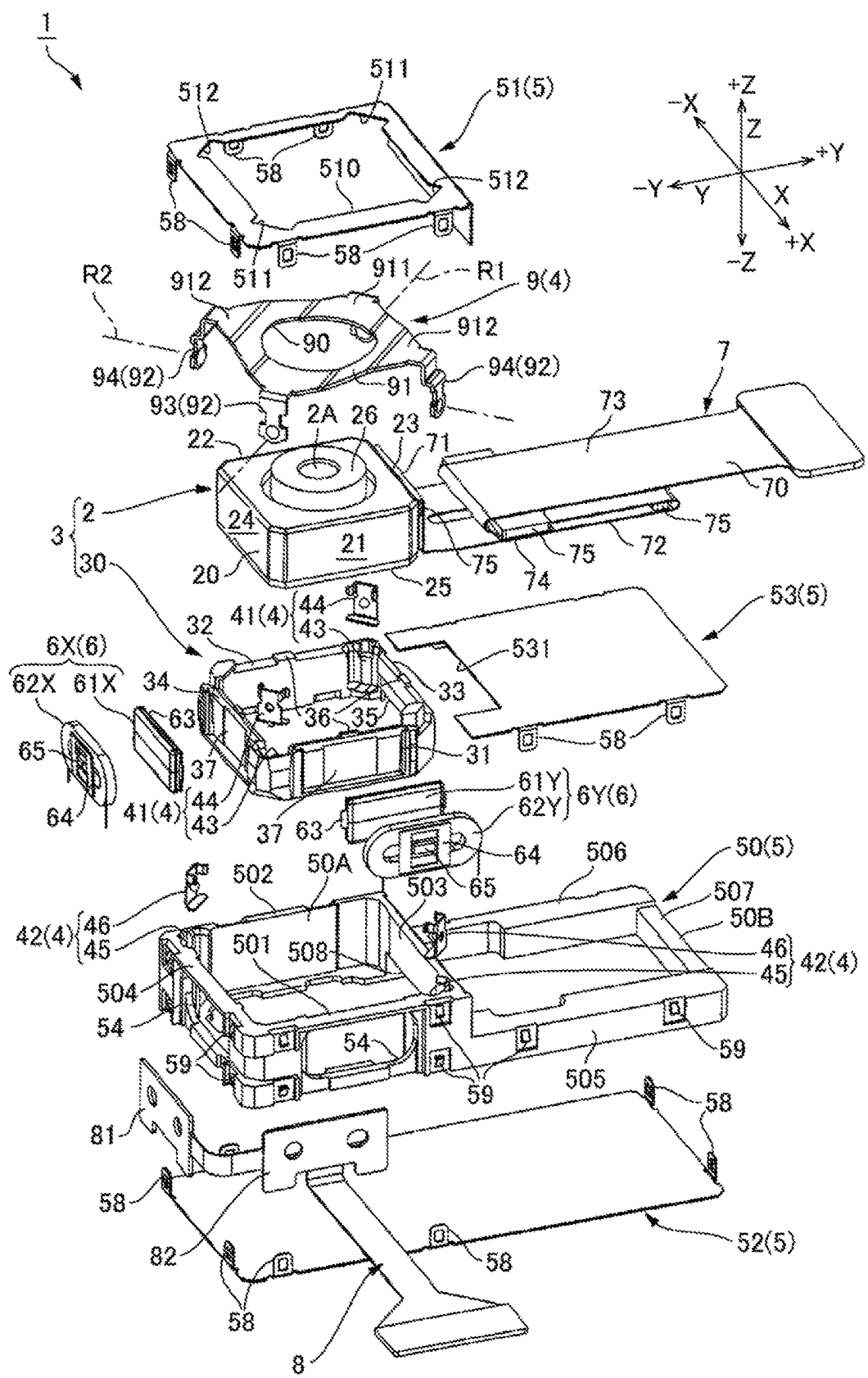
FIG. 2 is an exploded perspective view showing the optical unit with a shake correction function in FIG. 1 which is viewed from one side in an optical axis direction.
Figure 3:
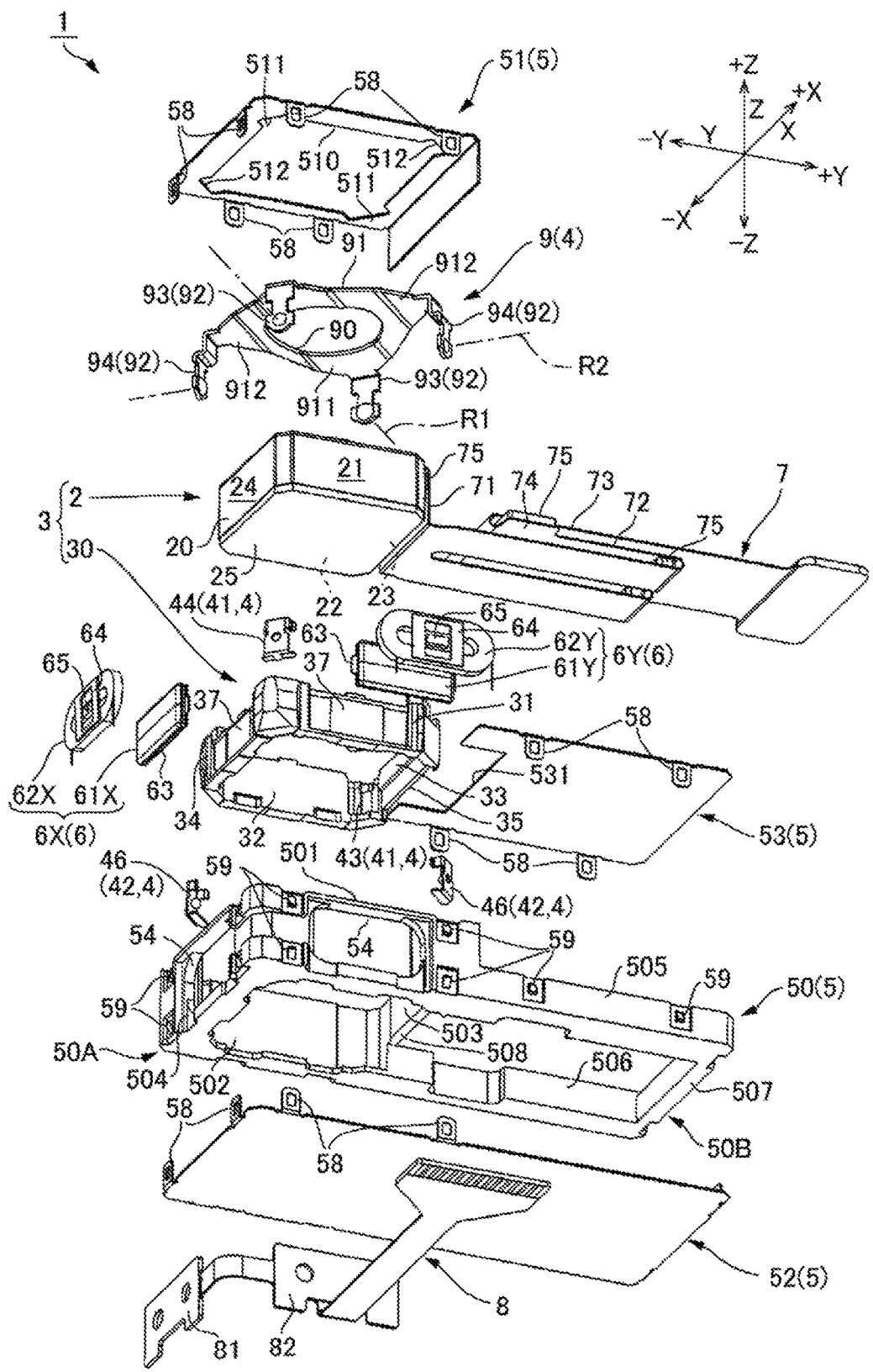
FIG. 3 is an exploded perspective view showing the optical unit with a shake correction function in FIG. 1 which is viewed from the other side in the optical axis direction.
Figure 4:
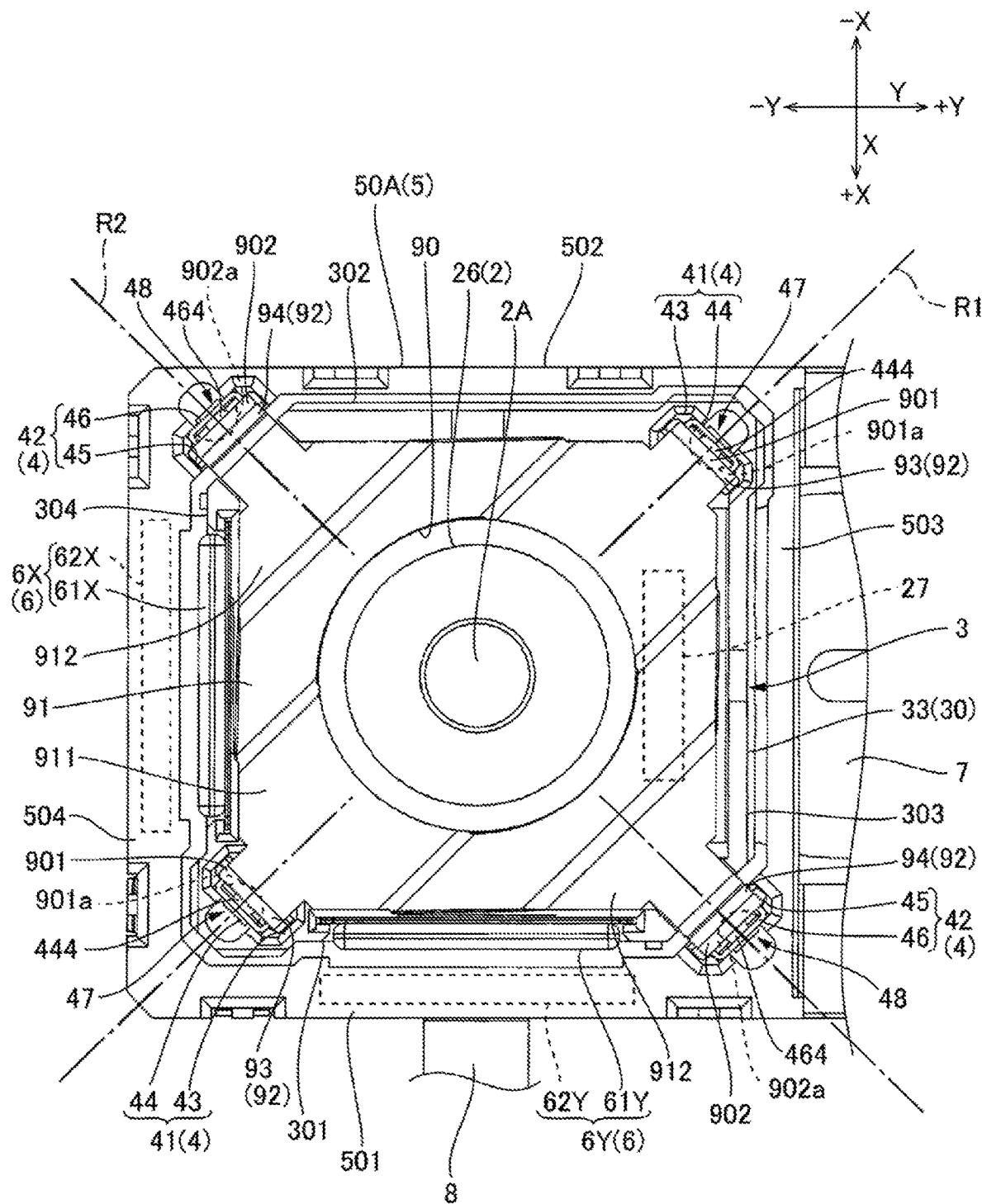
FIG. 4 is a plan view showing an optical unit with a shake correction function in which a cover is detached.
Figure 5:
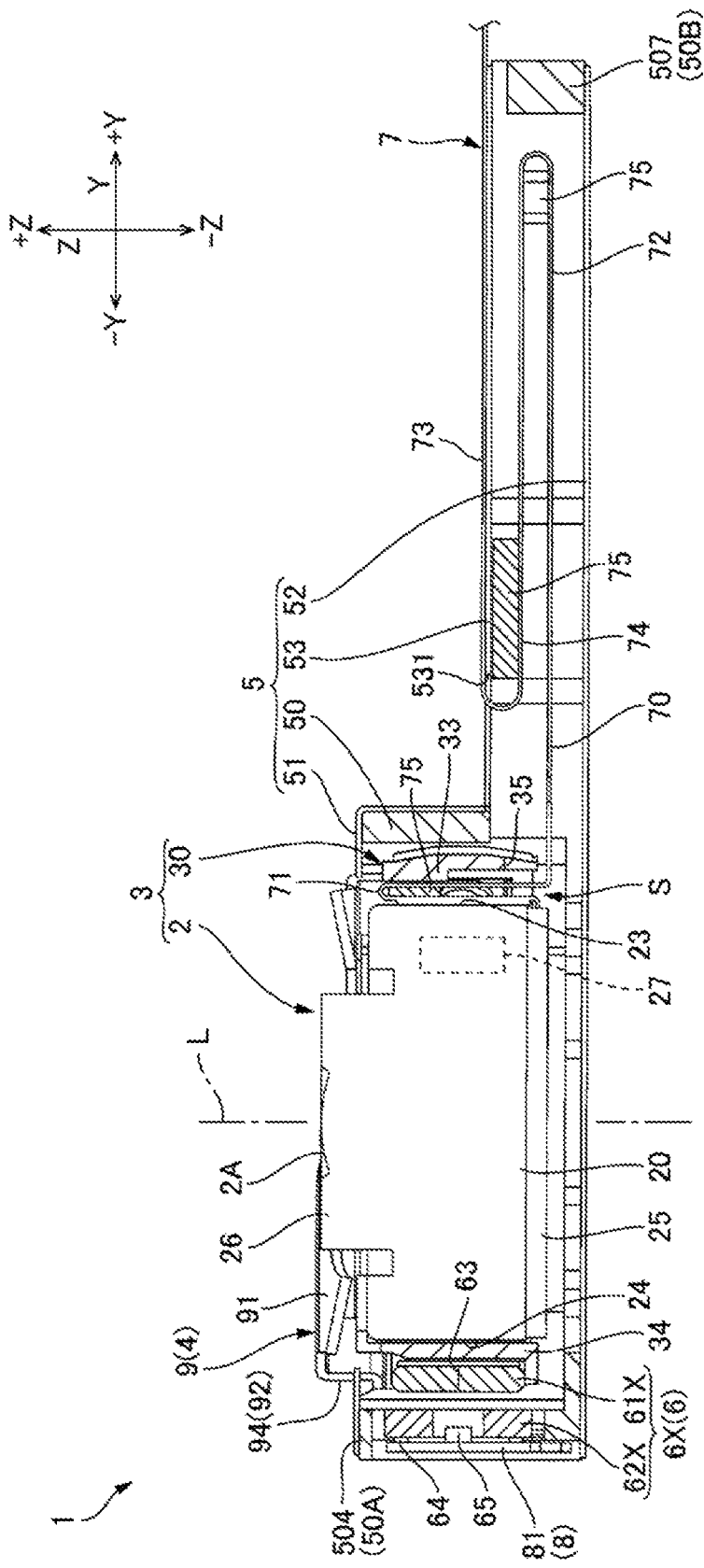
FIG. 5 is a partial cross-sectional view showing the optical unit with a shake correction function in FIG. 1 (partial cross-sectional view at the "A-A" position in FIG. 1).
Figure 6:
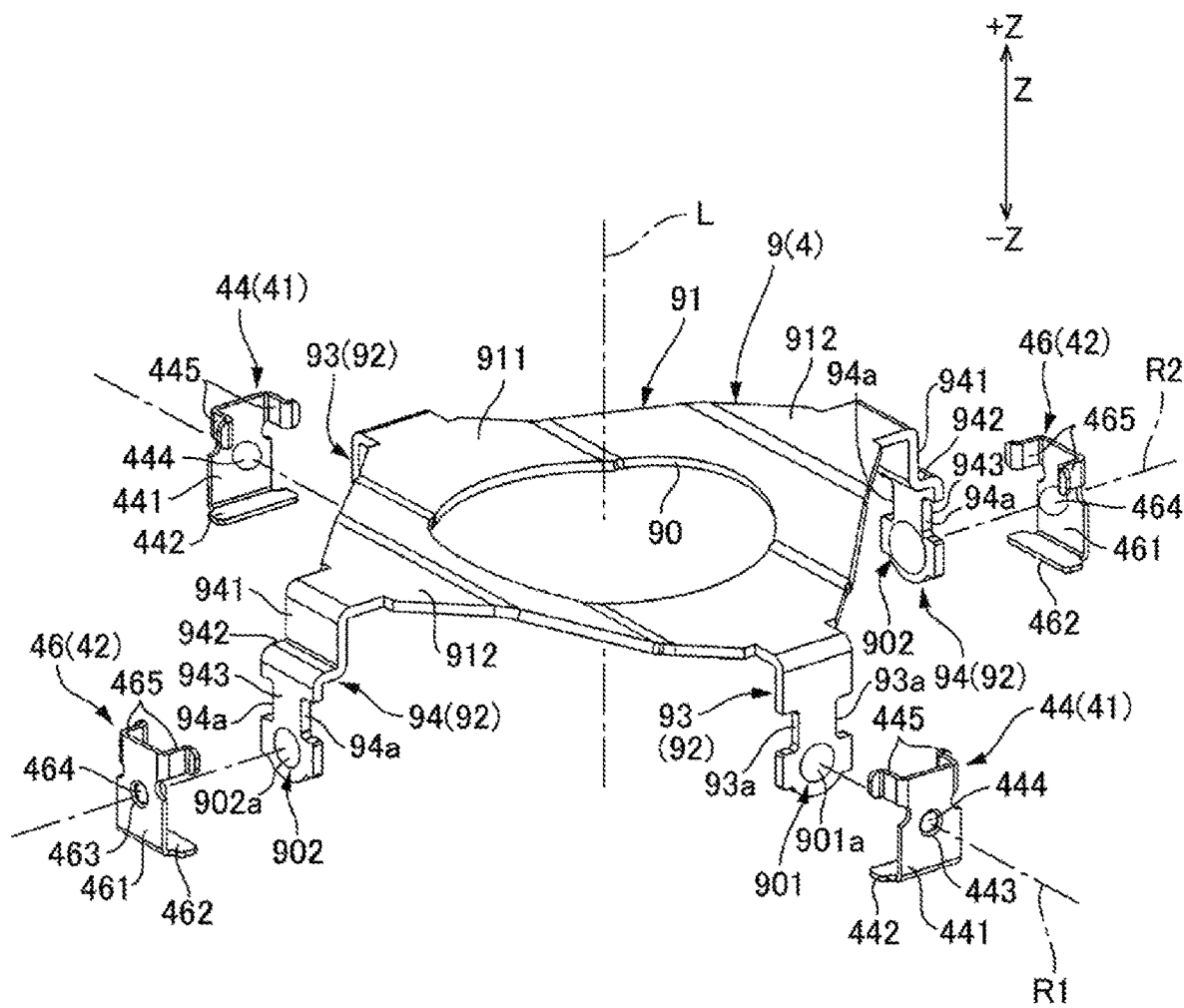
FIG. 6 is an exploded perspective view showing a gimbal frame, first thrust receiving members and second thrust receiving members.

FIG. 1 is a perspective view showing an optical unit 1 with a shake correction function in accordance with an embodiment of the present disclosure. FIG. 2 is an exploded perspective view showing the optical unit 1 with a shake correction function in FIG. 1 which is viewed from one side (from "+Z" direction) in an optical axis "L" direction. FIG. 3 is an exploded perspective view showing the optical unit 1 with a shake correction function in FIG. 1 which is viewed from the other side (from "−Z" direction) in the optical axis "L" direction. FIG. 4 is a plan view showing the optical unit 1 with a shake correction function in which a first cover 51 is detached. FIG. 5 is a partial cross-sectional view showing the optical unit 1 with a shake correction function in FIG. 1 (partial cross-sectional view at the "A-A" position in FIG. 1). FIG. 6 is an exploded perspective view showing a gimbal frame 9, first thrust receiving members 44 and second thrust receiving members 46.

As shown in FIG. 1, an optical unit 1 with a shake correction function includes an optical module 2 having an optical element such as a lens. The optical unit 1 with a shake correction function is, for example, used in an optical device such as a cell phone with a camera and a drive recorder or in an optical device such as an action camera mounted on a movement body such as a helmet, a bicycle, a radio-controlled helicopter or a wearable camera. In the optical device, when a shake is occurred in the optical device at the time of photographing, disturbance is generated in a photographed image. In order to avoid a photographed image being inclined, the optical unit 1 with a shake correction function corrects an inclination of the optical module 2 based on acceleration, turning speed, shaking amount and the like detected by a detection means such as a gyroscope.

As shown in FIGS. 1 through 5, the optical unit 1 with a shake correction function includes a movable body 3 on which the optical module 2 is mounted, a gimbal mechanism 4 structured to swingably support the movable body 3, a fixed body 5 which supports the movable body 3 through the gimbal mechanism 4, a shake correction drive mechanism 6 structured to swing the movable body 3 with respect to the fixed body 5, a first flexible printed circuit board 7 which is connected with the movable body 3, and a second flexible printed circuit board 8 which is attached to the fixed body 5. The first flexible printed circuit board 7 includes a connector part which is provided at an end part on an opposite side to a side connected with the movable body 3. Further, the second flexible printed circuit board 8 includes a terminal part which is provided at an end part on an opposite side to a side attached to the fixed body 5.

The optical unit 1 with a shake correction function performs a shake correction by swinging the movable body 3 around two axes ("X"-axis and "Y"-axis) which intersect the optical axis "L" ("Z"-axis) and intersect each other. A shake correction around the "X"-axis and a shake correction around the "Y"-axis are performed and thereby a shake correction in a pitching (vertical swing) direction and a shake correction in a yawing (lateral swing) direction are performed.

As shown in FIGS. 1 and 4, the movable body 3 is swingably supported around a first axis "R1" perpendicular to the optical axis "L" ("Z"-axis) and is swingably supported around a second axis "R2" perpendicular to the optical axis "L" and the first axis "R1" by the gimbal mechanism 4. The first axis "R1" and the second axis "R2" are inclined by 45 degrees with respect to the "X"-axis and the "Y"-axis. When turning around the first axis "R1" and turning around the second axis "R2" are combined, the movable body 3 can be swung around the "X"-axis and the "Y"-axis. Therefore, the movable body 3 is swingably supported around the "X"-axis and around the "Y"-axis by the gimbal mechanism 4.

As shown in FIG. 4, the gimbal mechanism 4 includes first supporting point parts 41 provided at diagonal positions on the first axis "R1" of the movable body 3, second supporting point parts 42 provided at diagonal positions on the second axis "R2" of the fixed body 5, and a gimbal frame 9. The gimbal frame 9 is a plate spring made of metal and is provided with two first support parts 901 (first spherical body support part) provided at diagonal positions on the first axis "R1" and two second support parts 902 (second spherical body support part) provided at diagonal positions on the second axis "R2". The gimbal mechanism 4 is assembled so that the first support part 901 is point-contacted with the first supporting point part 41 and the second support part 902 is point-contacted with the second supporting point part 42. As a result, the movable body 3 is swingably supported around the first axis "R1" and swingably supported around the second axis "R2" through the gimbal frame 9.

As shown in FIGS. 2 through 4, the shake correction drive mechanism 6 includes a first magnetic drive mechanism 6X structured to turn the movable body 3 around the "X"-axis and a second magnetic drive mechanism 6Y structured to turn the movable body 3 around the "Y"-axis. In this embodiment, the first magnetic drive mechanism 6X and the second magnetic drive mechanism 6Y are respectively disposed at one position.

The first magnetic drive mechanism 6X includes one set of a magnet 61X and a coil 62X. Further, the second magnetic drive mechanism 6Y includes one set of a magnet 61Y and a coil 62Y. The magnet 61X and the coil 62X of the first magnetic drive mechanism 6X face each other in the "Y"-axis direction. The magnet 61Y and the coil 62Y of the second magnetic drive mechanism 6Y face each other in the "X"-axis direction. In this embodiment, the magnets 61X and 61Y are disposed on the movable body 3 and the coils 62X and 62Y are disposed on the fixed body 5. The arrangement of the magnets 61X and 61Y and the coils 62X and 62Y may be reversed to this embodiment. In other words, it may be structured that the magnets 61X and 61Y are disposed on the fixed body 5 and the coils 62X and 62Y are disposed on the movable body 3.

As shown in FIG. 4, the movable body 3 is provided with a first face 301 and a second face 302, which are located on opposite sides with the optical axis "L" interposed therebetween in the "X"-axis direction, and a third face 303 and a fourth face 304 which are located on opposite sides with the optical axis "L" interposed therebetween in the "Y"-axis direction. The shake correction drive mechanism 6 is disposed on two faces, i.e., one of the first face 301 and the second face 302, and one of the third face 303 and the fourth face 304. In this embodiment, the second magnetic drive mechanism 6Y is disposed on the first face 301 facing the "+X" direction. Further, the first magnetic drive mechanism 6X is disposed on the fourth face 304 facing the "−Y" direction. The faces on which the shake correction drive mechanism 6 is disposed are limited to two faces and thus, a shape of the optical unit 1 with a shake correction function when viewed in the "Z"-axis direction (optical axis "L" direction) is reduced.

Further, the first flexible printed circuit board 7 connected with the movable body 3 is extended through a face of an outer peripheral face of the movable body 3 where the shake correction drive mechanism 6 is not disposed. In this embodiment, the first flexible printed circuit board 7 is extended through the third face 303 facing the "+Y" direction. When the first flexible printed circuit board 7 is extended in a direction where the shake correction drive mechanism 6 is not disposed, the first flexible printed circuit board 7 can be extended along a side face of the movable body 3 in the "Z"-axis (optical axis "L") direction. In this embodiment, as described below, a first folded portion 71 formed by bending the first flexible printed circuit board 7 to the "+Z" direction and then folding back to the reverse direction is disposed on a side face in the "+Y" direction of the movable body 3.

(Movable Body)

As shown in FIGS. 2 and 3, the movable body 3 includes the optical module 2 and a holder frame 30 (movable body frame) which holds the optical module 2. The optical module 2 includes a housing 20 in a rectangular shape when viewed in the optical axis "L" direction, a circuit board 25 disposed at an end part in the "−Z" direction of the housing 20, a tube part 26 protruded to the "+Z" direction from the housing 20, a lens group 2A (optical element) held by the tube part 26, and a lens drive mechanism 27 (see FIGS. 4 and 5) disposed in an inside of the housing 20.

The lens drive mechanism 27 performs focusing for an object to be photographed by adjusting a lens position of the lens group 2A arranged in the optical axis "L" direction. In this embodiment, the lens drive mechanism 27 includes a magnetic drive mechanism. In accordance with an embodiment of the present disclosure, the lens drive mechanism 27 may include a drive source other than the magnetic drive mechanism. For example, the lens drive mechanism 27 may include a motor. The lens drive mechanism 27 is disposed on an opposite side to the first magnetic drive mechanism 6X or the second magnetic drive mechanism 6Y with the optical axis "L" interposed therebetween. In this embodiment, the lens drive mechanism 27 is disposed on an opposite side to the first magnetic drive mechanism 6X with the optical axis "L" interposed therebetween.

The holder frame 30 is a frame-shaped member surrounding an outer peripheral side of the optical module 2. The housing 20 is provided with a first side face 21 facing the "+X" direction, a second side face 22 facing the "−X" direction, a third side face 23 facing the "+Y" direction, and a fourth side face 24 facing the "−Y" direction. The holder frame 30 is provided with a first frame part 31 along the first side face 21 of the housing 20, a second frame part 32 along the second side face 22, a third frame part 33 along the third side face 23, and a fourth frame part 34 along the fourth side face 24. The first frame part 31, the second frame part 32 and the fourth frame part 34 are abutted with the housing 20. On the other hand, a space "S" is provided between the third frame part 33 and the third side face 23 of the housing 20 (see FIG. 5). Further, the third frame part 33 is provided with a cut-out part 35 which is formed by cutting out an end part in the "−Z" direction of the third frame part 33 toward the "+Z" direction.

The first folded portion 71 formed by folding back the first flexible printed circuit board 7 once is disposed in the space "S" provided between the third frame part 33 and the third side face 23 of the housing 20. The first folded portion 71 is extended in the "Z"-axis direction along the side face 23 in the "+Y" direction of the housing 20. The first flexible printed circuit board 7 is bent at a substantially right angle at an end part in the "−Z" direction of the first folded portion 71 and is passed through the cut-out part 35 provided in the third frame part 33 and is extended to the "+Y" direction side from the holder frame 30.

As shown in FIGS. 2 and 3, the holder frame 30 includes the first supporting point parts 41 of the gimbal mechanism 4. In this embodiment, the first supporting point parts 41 are respectively provided at two positions on an inner face of a corner part where the second frame part 32 and the third frame part 33 are connected with each other, and on an inner face of a corner part where the first frame part 31 and the fourth frame part 34 are connected with each other.

The holder frame 30 is provided with protruded parts 36 which are protruded from end faces in the "+Z" direction of the first frame part 31, the second frame part 32, the third frame part 33 and the fourth frame part 34. The protruded parts 36 are respectively provided at one position at a center in the "Y"-axis direction of the first frame part 31 and the second frame part 32, and at a center in the "X"-axis direction of the third frame part 33 and the fourth frame part 34. The protruded parts 36 provided at four positions have the same protruded height to the "+Z" direction. The protruded parts 36 function as a stopper which restricts a swing range around the first axis "R1" of the movable body 3. In other words, when the movable body 3 is swung around the first axis "R1", the protruded part 36 is abutted with the gimbal frame 9 to restrict a swing range of the movable body 3.

The holder frame 30 is provided with magnet disposing recessed parts 37 on which the magnet 61X of the first magnetic drive mechanism 6X and the magnet 61Y of the second magnetic drive mechanism 6Y are disposed. In this embodiment, the magnet disposing recessed part 37 is formed in the first frame part 31 and the fourth frame part 34. The magnet disposing recessed part 37 is recessed to an inner side in the radial direction. In this embodiment, the holder frame 30 is made of resin and thus, a yoke member 63 in a plate shape is disposed in the magnet disposing recessed part 37. The yoke members 63 are fixed to inner faces of the magnet disposing recessed parts 37, and the magnets 61X and 61Y are fixed to outer side faces in the radial direction of the yoke member 63. Each of the magnets 61X and 61Y is magnetized so that magnets of an outer side face in the radial direction are different from each other with a magnetized polarizing line located at a substantially center in the "Z"-axis (optical axis "L") direction as a boundary.

(Fixed Body)

The fixed body 5 includes a case 50 (fixed body frame), a first cover 51 and a second cover 52 which are fixed to the case 50, and a wiring cover 53. In this embodiment, the case 50 is made of resin, and the first cover 51, the second cover 52 and the wiring cover 53 are made of nonmagnetic metal.

The case 50 is provided with an outer frame part 50A surrounding an outer peripheral side of the movable body 3, and a wiring accommodation part 50B which is protruded from an end part on the "−Z" direction side of the outer frame part 50A to the "+Y" direction. The first cover 51 is fixed to an end part in the "+Z" direction of the outer frame part 50A. The second cover 52 is fixed to an end part in the "−Z" direction of the outer frame part 50A and the wiring accommodation part 50B. The wiring cover 53 is fixed to an end part in the "+Z" direction of the wiring accommodation part 50B.

Elastic engaging parts 58 are provided at outer circumferential edges of the first cover 51, the second cover 52 and the wiring cover 53. Further, claw parts 59 are provided on an outer peripheral face of the case 50. The elastic engaging part 58 is a metal piece extending in the "Z"-axis (optical axis "L") direction and is provided with an opening part to which the claw part 59 is fitted. The claw part 59 is protruded to an outer side in the radial direction from an inner face of the recessed part formed on an outer peripheral face of the case 50. The first cover 51, the second cover 52 and the wiring cover 53 are fixed to the case 50 by engaging the elastic engaging parts 58 with the claw parts 59.

The first cover 51 is provided with two elastic engaging parts 58 extended in the "Z" direction at each of respective edges in the three directions except the "+Y" direction. An outer peripheral face at an end part in the "+Z" direction of the outer frame part 50A is provided with the claw parts 59 at a position corresponding to each of the elastic engaging parts 58 provided in the first cover 51. The second cover 52 is provided with two elastic engaging parts 58 extended in the "+Z" direction at each of respective edges in four directions. Outer peripheral faces of end parts in the "−Z" direction of the outer frame part 50A and the wiring accommodation part 50B are provided with the claw parts 59 at a position corresponding to each of the elastic engaging parts 58 provided in the second cover 52. The wiring cover 53 is provided with two elastic engaging parts 58 extended in the "−Z" direction at each of respective edges in the two directions, i.e., the "+X" direction and the "−X" direction. An outer peripheral face of an end part in the "+Z" direction of the wiring accommodation part 50B is provided with the claw parts 59 at a position corresponding to each of the elastic engaging parts 58 provided in the wiring cover 53.

The first cover 51 faces an outer peripheral portion of the movable body 3 which is disposed on an inner side of the outer frame part 50A in the "Z"-axis direction and thereby, protrusion of the movable body 3 to the "+Z" direction is restricted. The first cover 51 is provided with an opening part 510 formed in a substantially rectangular shape. In this embodiment, a part of the gimbal frame 9 is protruded to the "+Z" direction through the opening part 510. Further, a part of the optical module 2 is protruded to the "+Z" direction through a center hole 90 provided at a center in the radial direction of the gimbal frame 9. The first cover 51 is located at an end part in the "+Z" direction of the fixed body 5. Therefore, in this embodiment, parts of the optical module 2 and the gimbal frame 9 are protruded on the "+Z" direction side with respect to the end part in the "+Z" direction of the fixed body 5.

The outer frame part 50A is provided with a first frame part 501 and a second frame part 502, which are extended parallel to the "Y"-axis direction on the "+X" direction side and the "−X" direction side of the movable body 3, and a third frame part 503 and a fourth frame part 504 which are extended parallel to the "X"-axis direction on the "+Y" direction side and the "−Y" direction side of the movable body 3. The wiring accommodation part 50B is provided with a fifth frame part 505 and a sixth frame part 506, which are extended parallel to the "+Y" direction from end parts in the "−Z" direction of the first frame part 501 and the second frame part 502, and a seventh frame part 507 extended in the "X"-axis direction which is connected with end parts in the "+Y" direction of the fifth frame part 505 and the sixth frame part 506.

The outer frame part 50A includes the second supporting point part 42 of the gimbal mechanism 4. In this embodiment, the second supporting point parts 42 are provided at two positions respectively on an inner face of a corner part where the first frame part 501 and the third frame part 503 are connected with each other and on an inner face of a corner part where the second frame part 502 and the fourth frame part 504 are connected with each other. As shown in FIG. 4, the second supporting point parts 42 of the fixed body 5 and the second support parts 902 of the gimbal frame 9 structure a second connection mechanism 48 structured to turnably support the gimbal frame 9 around the second axis "R2" in the gimbal mechanism 4.

The outer frame part 50A is provided with coil arrangement holes 54 to which the coil 62X of the first magnetic drive mechanism 6X and the coil 62Y of the second magnetic drive mechanism 6Y are fixed with an adhesive or the like. In this embodiment, the coil arrangement holes 54 are penetrated through the first frame part 501 and the fourth frame part 504. Each of the coils 62X and 62Y is an air core coil in an elliptical shape, and two long sides located on the "+Z" direction side and the "−Z" direction side are utilized as effective sides. The second flexible printed circuit board 8 is fixed to the first frame part 501 and the fourth frame part 504 of the outer frame part 50A from an outer side in the radial direction. The second flexible printed circuit board 8 is provided with a first circuit board portion 81, which is overlapped with the coil arrangement hole 54 of the fourth frame part 504 from an outer side in the radial direction, and a second circuit board portion 82 which is overlapped with the coil arrangement hole 54 of the first frame part 501 from an outer side in the radial direction.

Rectangular magnetic plates 64 are respectively disposed between the first circuit board portion 81 and the coil 62X and between the second circuit board portion 82 and the coil 62Y. The magnetic plate 64 disposed between the first circuit board portion 81 and the coil 62X faces the magnet 61X to structure a magnetic spring for returning the movable body 3 to a turning reference position in a turning direction around the "X"-axis. Further, the magnetic plate 64 disposed between the second circuit board portion 82 and the coil 62Y faces the magnet 61Y to structure a magnetic spring for returning the movable body 3 to a turning reference position in a turning direction around the "Y"-axis.

The magnetic plates 64 are provided with rectangular through holes at positions overlapping with center holes of the coils 62X and 62Y, and a magnetic sensor 65 is disposed in the through hole. The magnetic sensor 65 is, for example, a Hall element. The optical unit 1 with a shake correction function detects a swing angle around the "X"-axis of the movable body 3 based on an output of the magnetic sensor 65 disposed at the center of the coil 62X. Further, the optical unit 1 with a shake correction function detects a swing angle around the "Y"-axis of the movable body 3 based on an output of the magnetic sensor 65 disposed at the center of the coil 62Y.

(Gimbal Frame)

As shown in FIG. 6, the gimbal frame 9 is provided with a first frame portion 91 (connection frame portion) in a substantially square shape when viewed in the "Z"-axis direction and second frame portions 92 which are bent from four corner parts of the first frame portion 91 at a substantially right angle and are extended to the "−Z" direction. A center of the first frame portion 91 is provided with a center hole 90 penetrated through the first frame portion 91. As shown in FIG. 5, the first frame portion 91 is overlapped with the housing 20 of the optical module 2 and the holder frame 30 when viewed in the "Z"-axis (optical axis "L") direction. As shown in FIG. 4, the first frame portion 91 is located on an inner peripheral side of the holder frame 30 except four corner parts connected with the second frame portions 92 when viewed in the "Z"-axis (optical axis "L") direction.

As shown in FIGS. 1 and 6, a center portion 911 of the first frame portion 91 located at a center in the second axis "R2" direction is recessed to the "−Z" direction, and corner portions 912 at both ends in the second axis "R2" direction are located on the "+Z" direction side with respect to the center portion 911. In other words, the corner portions 912 in the second axis "R2" direction of the first frame portion 91 are separated from the movable body 3 with respect to the center portion 911. Therefore, even when the movable body 3 is swung around the first axis "R1" on the "−Z" direction side with respect to the gimbal frame 9 and both ends in the second axis "R2" direction of the movable body 3 (in this embodiment, the corner parts in the second axis "R2" direction of the housing 20) are moved in the "Z"-axis direction, a collision of the movable body 3 with the gimbal frame 9 can be avoided.

Further, the center portion 911 is extended to the corner parts in the first axis "R1" direction of the first frame portion 91. The corner parts in the first axis "R1" direction of the first frame portion 91 are portions of the gimbal frame 9 which are moved largest in the "Z"-axis (optical axis "L") direction in a case that the movable body 3 is swung around the second axis "R2" and the gimbal frame 9 is swung around the second axis "R2" with the second supporting point parts 42 as a turning center. As described above, in a case that the corner parts in the first axis "R1" direction of the first frame portion 91 are formed in the most recessed shape to the "−Z" direction, an operation space of the gimbal frame 9 when the movable body 3 is swung can be reduced in the "Z"-axis (optical axis "L") direction. Therefore, a height of a space for disposing the optical unit 1 with a shake correction function required in the "Z"-axis (optical axis "L") direction can be reduced.

The second frame portions 92 comprise first support part extended parts 93, which are provided at two corner parts on the first axis "R1" of the gimbal frame 9, and second support part extended parts 94 provided at two corner parts on the second axis "R2" of the gimbal frame 9. The first support part extended part 93 is extended to the "−Z" direction in a straight line shape from the corner part of the first frame portion 91. The first support part extended part 93 is provided with the first support part 901 having a first concave curved face 901a at its tip end portion. The first concave curved face 901a is formed by press working and is recessed to an inner side in the radial direction. A curvature radius of the first concave curved face 901a is larger than a radius of a first spherical body 444. Further, the first support part extended part 93 is provided with a pair of first cut-out recessed parts 93a, which are recessed from both end edges in a circumferential direction around the optical axis "L" in an orthogonal direction perpendicular to the "Z"-axis direction and the first axis "R1" direction, on the "+Z" direction side of the first support part 901.

The second support part extended part 94 is provided with a first portion 941 extended to the "−Z" direction from the corner portion of the first frame portion 91, a second portion 942 which is bent at a substantially right angle from the first portion 941 and is extended to an outer side in the radial direction, and a third portion 943 which is bent at a substantially right angle from the second portion 942 and is extended to the "−Z" direction. The third portion 943 is provided with the second support part 902 having a second concave curved face 902a at its tip end portion. The second concave curved face 902a is formed by press working and is recessed to an inner side in the radial direction. A curvature radius of the second concave curved face 902a is larger than a radius of a second spherical body 464. Further, the second support part extended part 94 is provided with a pair of second cut-out recessed parts 94a, which are recessed from both end edges in the circumferential direction around the optical axis "L" in an orthogonal direction perpendicular to the "Z"-axis direction and the second axis "R2" direction, on the "+Z" direction side of the second support part 902. An end in the "+Z" direction of the first support part extended part 93 and an end in the "Z" direction of the second support part extended part 94 are connected with each other through the first frame portion 91.

In this embodiment, the first support part extended part 93 is disposed in a cut-out part 511 which is formed by cutting out a corner part in the first axis "R1" direction of the opening part 510 of the first cover 51 to an outer side in the radial direction. As a result, the first support part extended part 93 is located between the optical module 2 and the holder frame 30 on both sides in the first axis "R1" direction of the optical module 2. Further, the first supporting point part 41 which is provided on the movable body 3 side and is a supporting point part of the gimbal mechanism 4 is disposed on the "−Z" direction side with respect to the cut-out part 511, and a tip end part of the first support part extended part 93 is supported by the first supporting point part 41. In this manner, a first connection mechanism 47 is structured, and the movable body 3 and the gimbal frame 9 are turnably connected with each other around the first axis "R1". Further, the second support part extended part 94 is disposed in a cut-out part 512 which is formed by cutting out a corner part in the second axis "R2" direction of the opening part 510 of the first cover 51 to an outer side in the radial direction. As a result, the second support part extended part 94 is located between the holder frame 30 and the case 50 on both sides in the second axis "R2" direction of the holder frame 30. The second supporting point part 42 which is provided on the fixed body 5 side and is a supporting point part of the gimbal mechanism 4 is disposed on the "−Z" direction side with respect to the cut-out part 512, and a tip end part of the second support part extended part 94 is supported by the second supporting point part 42. In this manner, the second connection mechanism 48 is structured, and the fixed body 5 and the gimbal frame 9 are turnably connected with each other around the second axis "R2".

(Extended Shape of First Flexible Printed Circuit Board 7)

The first flexible printed circuit board 7 is folded back once on an inner side of the holder frame 30 to form the first folded portion 71 and is extended through the cut-out part 35 of the holder frame 30 to the "+Y" direction and then, the first flexible printed circuit board 7 is folded back in an inside of the outer frame part 50A and is extended to an inner side of the wiring accommodation part 50B through a cut-out part 508 which is formed by cutting out an end part in the "−Z" direction of the third frame part 503 of the outer frame part 50A to the "+Z" direction. The first flexible printed circuit board 7 is provided with a second folded portion 72 which is extended to the "+Y" direction on an inner side of the wiring accommodation part 50B and is folded back once to the reverse direction, and a third folded portion 73 overlapped with the second folded portion 72 on the "+Z" direction side.

The wiring cover 53 is provided with a cut-out part 531 which is formed by cutting out a substantially center of an edge in the "−Y" direction to the "+Y" direction. The third folded portion 73 of the first flexible printed circuit board 7 is extended to an outer side of the wiring accommodation part 50B through the cut-out part 531 and is extended to the "+Y" direction side along the wiring cover 53. The first flexible printed circuit board 7 includes a fixing part 74 which is fixed to the wiring cover 53. The fixing part 74 is fixed to an edge of the cut-out part 531.

The first flexible printed circuit board 7 includes a flexible circuit board 70 and reinforcing plates 75 which are fixed to the flexible circuit board 70. The reinforcing plate 75 is disposed at three positions, i.e., the first folded portion 71, the second folded portion 72 and the fixing part 74. In the first folded portion 71 and the second folded portion 72, the reinforcing plate 75 is disposed in a bent portion of the flexible circuit board 70 which is bent to a reverse direction. Therefore, the reinforcing plate 75 is sandwiched by the flexible circuit board 70 and functions as a spacer. The reinforcing plate 75 provided in the fixing part 74 is disposed between the wiring cover 53 and the flexible circuit board 70 and functions as a spacer between the wiring cover 53 and the flexible circuit board 70.

(Details of First Connection Mechanism 47 and Second Connection Mechanism 48)

Figure 7:
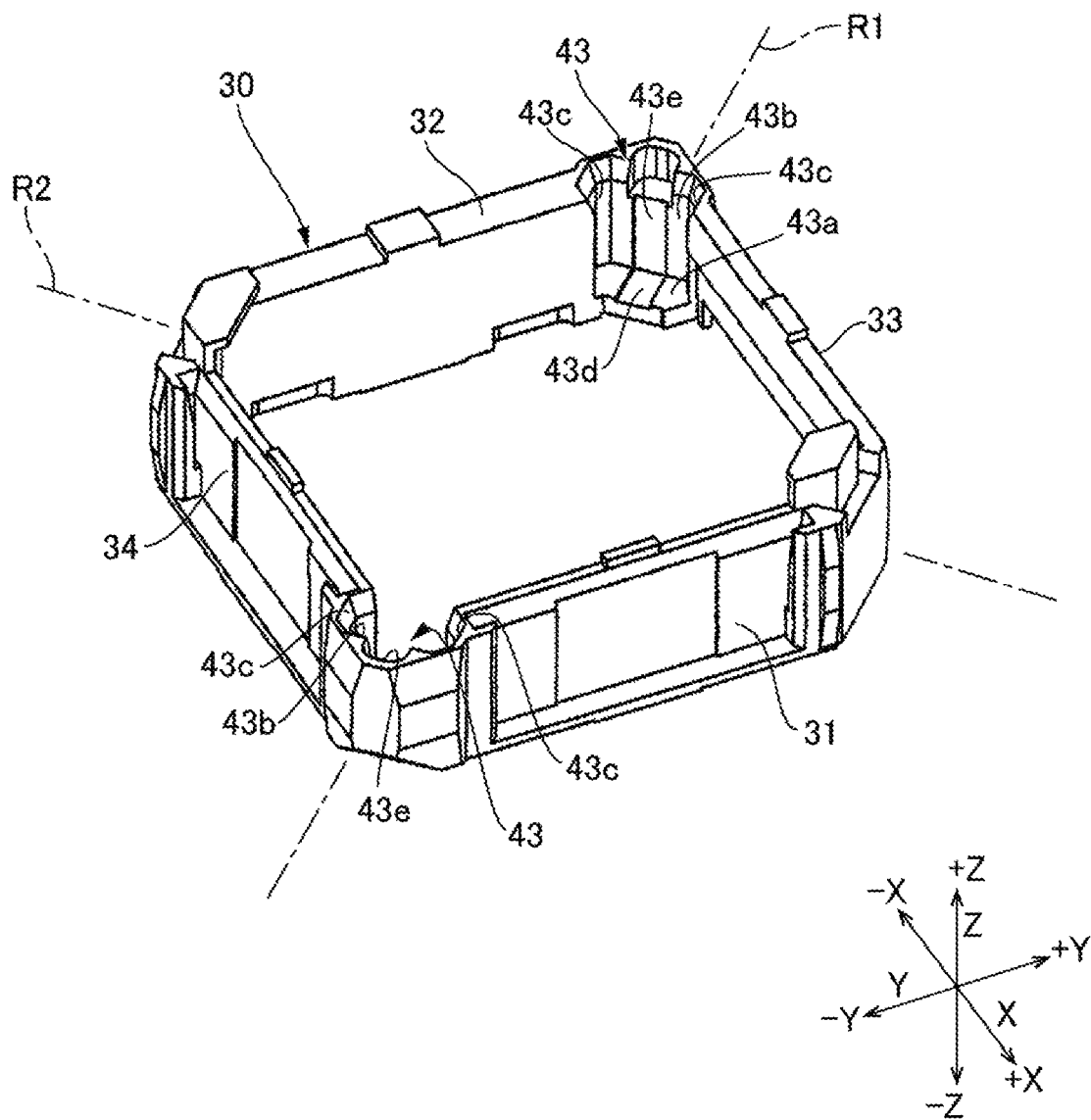
FIG. 7 is a perspective view showing a holder frame which is viewed from one side in an optical axis direction.
Figure 8:
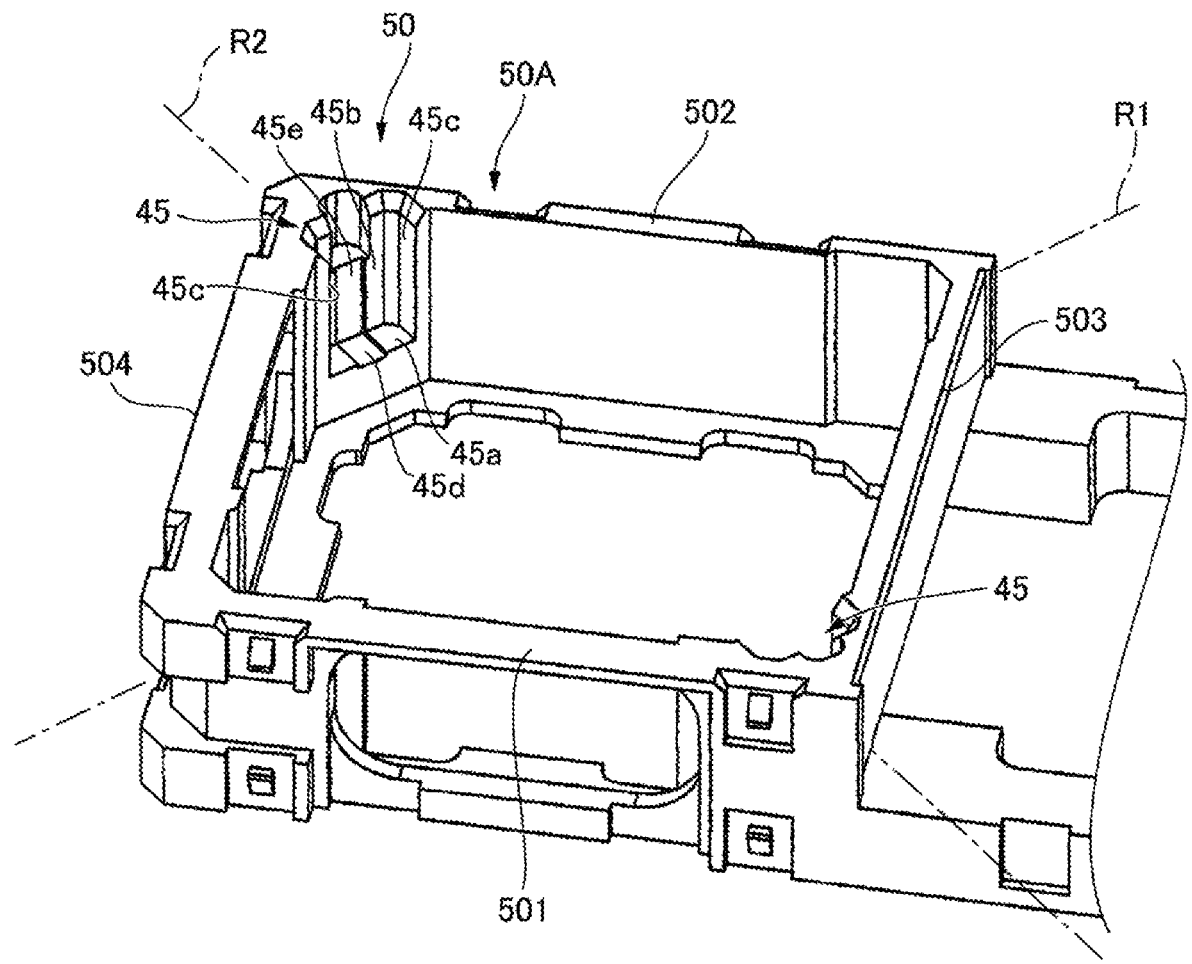
FIG. 8 is a perspective view showing an outer frame part of a case which is viewed from one side in an optical axis direction.
Figure 8:
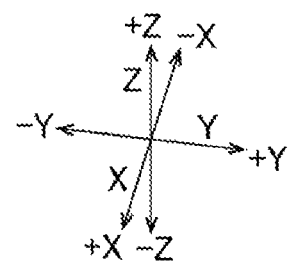

Next, The first connection mechanism 47 and the second connection mechanism 48 will be described in detail below. FIG. 7 is a perspective view showing the holder frame 30 which is viewed from the "+Z" direction side. FIG. 8 is a perspective view showing the outer frame part 50A of the case 50 which is viewed from the "+Z" direction side. (a) of FIG. 9 is a perspective view showing the first thrust receiving member 44 and the second thrust receiving member 46 which is viewed from an inner peripheral side, and (b) of FIG. 9 is a perspective view showing the first thrust receiving member 44 and the second thrust receiving member 46 which is viewed from an outer peripheral side. FIG. 10 is an exploded perspective view showing the first thrust receiving member 44 and the second thrust receiving member 46. The first thrust receiving member 44 and the second thrust receiving member 46 are the same member and thus, in (a) and (b) of FIG. 9 and FIG. 10, the first thrust receiving member 44 and the second thrust receiving member 46 are shown in a single drawing. FIG. 11 is a cross-sectional view showing the first connection mechanism 47 which is cut along the first axis "R1". FIG. 12 is an explanatory view showing the first connection mechanism 47 and the second connection mechanism 48. FIG. 12 shows a state that the holder frame 30 and the case 50 are detached from the optical unit 1 with a shake correction function and which is viewed in the first axis "R1" direction.

As shown in FIG. 4, the first connection mechanism 47 includes the first support part 901 of the gimbal frame 9 and the first supporting point part 41 provided in the movable body 3. The first supporting point part 41 is, as shown in FIG. 7, provided with a recessed part 43 which is recessed to an outer side in the radial direction on each of an inner face of the corner part where the second frame part 32 of the holder frame 30 and the third frame part 33 are connected with each other, and an inner face of the corner part where the first frame part 31 and the fourth frame part 34 are connected with each other. Further, the first connection mechanism 47 includes, as shown in (a) and (b) of FIG. 9, the first thrust receiving member 44 which is disposed in each of the recessed parts 43, and the first spherical body 444 which is fixed to a first spherical body fixing part 101 of each of the first thrust receiving members 44. As shown in FIG. 7, each of the recessed parts 43 of the holder frame 30 is defined by a bottom face 43a extended in the first axis "R1" direction, a rear face 43b extended to the "+Z" direction from an outer peripheral end of the bottom face 43a, and a pair of side faces 43c which are extended to the "+Z" direction from both ends in the circumferential direction around the optical axis "L" of the bottom face 43a. The bottom face 43a is provided with a first groove 43d extended in the first axis "R1" direction with a constant width in its center portion in the circumferential direction. The rear face 43b is provided with a second groove 43e extended in the "Z"-axis direction with a constant width in its center portion in the circumferential direction. The first groove 43d and the second groove 43e are connected with each other.

The first thrust receiving member 44 and the first spherical body 444 are made of metal. As shown in FIG. 6 and (a) and (b) of FIG. 9, the first thrust receiving member 44 is provided with a first plate part 441 (first facing part) in a plate shape which is extended in the "Z"-axis direction, a second plate part 442 (first bent part) which is bent at a substantially right angle from an end part in the "−Z" direction of the first plate part 441 and is extended to an inner side in the radial direction, a first fixing hole 443 which penetrates through the first plate part 441 in the first axis "R1" direction, and a pair of third plate parts 445 (first insertion part) which are bent at a substantially right angle from both sides in a circumferential direction of an end part in the "+Z" direction of the first plate part 441 and are extended to an inner side in the radial direction. End parts on an inner peripheral side of a pair of the third plate parts 445 are respectively bent in directions so as to be separated from each other in the circumferential direction. The first fixing hole 443 is located between the second plate part 442 and a pair of the third plate parts 445 in the "Z"-axis direction.

As shown in FIG. 10, a diameter "D1" of the first fixing hole 443 is smaller than a diameter "D2" of the first spherical body 444. The first spherical body 444 is fixed to the first plate part 441 by welding in a state that the first spherical body 444 is partly fitted to the first fixing hole 443. An opening edge portion of the first fixing hole 443 in a face on an inner peripheral side of the first plate part 441 is the first spherical body fixing part 101 to which the first spherical body 444 is fixed. As shown in (b) of FIG. 9, in a state that the first spherical body 444 has been fixed to the first spherical body fixing part 101, an end of the first spherical body 444 on an outer peripheral side in the first axis "R1" direction (end on an opposite side to the first support part 901) is located on an inner side of the first fixing hole 443. Therefore, the first spherical body 444 does not protrude to an outer peripheral side from the first plate part 441.

In this embodiment, the first fixing hole 443 is formed by punching work which is performed on the first thrust receiving member 44 from an opposite side (outer peripheral side) to a side where the first spherical body 444 is fixed. As a result, as shown in (b) of FIG. 9, an opening edge of the first fixing hole 443 of the first plate part 441 on an opposite side to a side where the first spherical body 444 is fixed is provided with sagging 443a. In other words, an opening end portion of the first fixing hole 443 on an opposite side to a side where the first spherical body 444 is fixed is enlarged in diameter to an outer side toward an opening end. In this case, when punching work is performed, an end face of the first fixing hole 443 of the first plate part 441 on a side where the first spherical body 444 is fixed is formed with a burr. However, the burr is removed by crushing processing or polishing processing.

The first spherical body 444 is fixed to the first plate part 441 by welding. More specifically, the first spherical body 444 is placed on the first fixing hole 443 of the first thrust receiving member 44 and set in a state that the first spherical body 444 is partly fitted to the first fixing hole 443. Next, an inside of the first fixing hole 443 is irradiated with a laser beam from an opposite side to a side where the first spherical body 444 is fixed to the first plate part 441. As a result, welding is performed on a boundary portion between the first spherical body 444 and an inner wall face of the first fixing hole 443 of the first thrust receiving member 44. Therefore, as shown in (b) of FIG. 9, a first welded mark 102 which fixes the first spherical body 444 to the first thrust receiving member 44 is left and provided in the boundary portion between the first spherical body 444 and the inner wall face of the first fixing hole 443 of the first thrust receiving member 44. In this embodiment, the first spherical body 444 and the first thrust receiving member 44 are welded at two positions separated from each other. Therefore, the boundary portion between the first spherical body 444 and the inner wall face of the first fixing hole 443 of the first thrust receiving member 44 is left and provided with two first welded marks 102.

In this state, the first thrust receiving member 44 is inserted into the recessed part 43 in a state that the first thrust receiving member 44 is abutted with a pair of the side faces 43c of the recessed part 43 of the holder frame 30. As a result, the first supporting point part 41 is positioned in the circumferential direction around the optical axis "L". Further, the second plate part 442 of the first thrust receiving member 44 is abutted with the bottom face 43a of the recessed part 43 and thereby, the first supporting point part 41 is positioned in the "Z"-axis (an optical axis "L") direction. In addition, the first thrust receiving member 44 is fixed to the holder frame 30 with an adhesive which is applied to the first groove 43d and the second groove 43e. When a state that the first thrust receiving member 44 is fixed to the holder frame 30 is viewed in the first axis "R1" direction, the first fixing hole 443 is overlapped with the second groove 43e.

When the gimbal frame 9 and the movable body 3 are to be connected with each other, as shown in FIG. 4, the first support part extended parts 93 of the gimbal frame 9 are inserted between the optical module 2 and the holder frame 30 on both sides in the first axis "R1" direction of the optical module 2. As a result, as shown in FIG. 11, the first support part 901 provided in the first support part extended part 93 and the first plate part 441 of the first thrust receiving member 44 fixed to the movable body 3 are faced each other. Next, the first spherical body 444 fixed to the first plate part 441 is inserted into the first concave curved face 901a to bring the first spherical body 444 and the first support part 901 into point contact with each other. In parallel therewith, as shown in FIG. 12, a pair of the third plate parts 445 of the first thrust receiving member 44 is inserted into a pair of the first cut-out recessed parts 93a of the first support part extended part 93. In this manner, the first connection mechanism 47 is structured. In this case, when the first spherical body 444 and the first support part 901 are contacted with each other, the first support part extended part 93 is resiliently bent and the first support part 901 is elastically contacted with the first spherical body 444. Therefore, the first spherical body 444 is hard to be disengaged from the first support part 901. Further, in a state that the first connection mechanism 47 is structured, the second plate part 442 of the first thrust receiving member 44 and the first support part extended part 93 are faced each other with a space therebetween in the "Z"-axis direction.

The second connection mechanism 48 includes the second support part 902 of the gimbal frame 9 and the second supporting point part 42 provided in the case 50. The second supporting point part 42 is, as shown in FIG. 8, provided with a recessed part 45 which is recessed to an outer side in the radial direction on each of an inner face of a corner part where the first frame part 501 of the case 50 and the third frame part 503 are connected with each other, and an inner face of a corner part where the second frame part 502 and the fourth frame part 504 are connected with each other. Further, the second connection mechanism 48 includes the second thrust receiving member 46 which is disposed in each of the recessed parts 45, and a second spherical body 464 which is fixed to a second spherical body fixing part 104 of each of the second thrust receiving members 46. Each of the recessed parts 45 of the case 50 is defined by a bottom face 45a extended in the second axis "R2" direction, a rear face 45b extended to the "+Z" direction from an outer peripheral end of the bottom face 45a, and a pair of side faces 45c which are extended to the "+Z" direction from both ends in the circumferential direction around the optical axis "L" of the bottom face 45a. The bottom face 45a is provided with a first groove 45d extended in the second axis "R2" direction with a constant width in its center portion in the circumferential direction. The rear face 45b is provided with a second groove 45e extended in the "Z"-axis direction with a constant width in its center portion in the circumferential direction. The first groove 45d and the second groove 45e are connected with each other.

The second thrust receiving member 46 and the second spherical body 464 are made of metal. In this embodiment, the second thrust receiving member 46 is the same member as the first thrust receiving member 44, and the second spherical body 464 is the same member as the first spherical body 444.

As shown in FIG. 6 and (a) and (b) of FIG. 9, the second thrust receiving member 46 is provided with a first plate part 461 (second facing part) in a plate shape which is extended in the "Z"-axis direction, a second plate part 462 (second bent part) which is bent at a substantially right angle from an end part in the "−Z" direction of the first plate part 461 and is extended to an inner side in the radial direction, a second fixing hole 463 which penetrates through the first plate part 461 in the second axis "R2" direction, and a pair of third plate parts 465 (second insertion part) which are bent at a substantially right angle from both sides in the circumferential direction of an end part in the "+Z" direction of the first plate part 461 and are extended to an inner side in the radial direction. End parts on an inner peripheral side of a pair of the third plate parts 465 are respectively bent in directions so as to be separated from each other in the circumferential direction. The second fixing hole 463 is located between the second plate part 462 and a pair of the third plate parts 465 in the "Z"-axis direction.

As shown in FIG. 10, a diameter "D1" of the second fixing hole 463 is smaller than a diameter "D2" of the second spherical body 464. The second spherical body 464 is fixed to the first plate part 461 by welding in a state that the second spherical body 464 is partly fitted to the second fixing hole 463. An opening edge portion of the second fixing hole 463 in a face on an inner peripheral side of the first plate part 461 is the second spherical body fixing part 104 to which the second spherical body 464 is fixed. In a state that the second spherical body 464 has been fixed to the second spherical body fixing part 104, as shown in (b) of FIG. 9, an end of the second spherical body 464 on an outer peripheral side in the second axis "R2" direction (end on an opposite side to the second support part 902) is located on an inner side of the second fixing hole 463. Therefore, the second spherical body 464 does not protrude to an outer peripheral side from the first plate part 461. An opening edge of the second fixing hole 463 of the first plate part 461 on an opposite side to a side where the second spherical body 464 is fixed is provided with sagging 463a. In other words, an opening end portion of the second fixing hole 463 on an opposite side to a side where the second spherical body 464 is fixed is increased in diameter to an outer side toward an opening end.

The second spherical body 464 is fixed to the first plate part 461 by welding. More specifically, the second spherical body 464 is placed on the second fixing hole 463 of the second thrust receiving member 46 and set in a state that the second spherical body 464 is partly fitted to the second fixing hole 463. Next, an inside of the second fixing hole 463 is irradiated with a laser beam from an opposite side to a side where the second spherical body 464 is fixed to the first plate part 461. As a result, welding is performed on a boundary portion between the second spherical body 464 and an inner wall face of the second fixing hole 463 of the second thrust receiving member 46. Therefore, a second welded mark 105 which fixes the second spherical body 464 to the second thrust receiving member 46 is left and provided in the boundary portion between the second spherical body 464 and the inner wall face of the second fixing hole 463 of the second thrust receiving member 46. In this embodiment, the second spherical body 464 and the second thrust receiving member 46 are welded at two positions separated from each other. Therefore, the boundary portion between the second spherical body 464 and the inner wall face of the second fixing hole 463 of the second thrust receiving member 46 is left and provided with two second welded marks 105.

In this state, the second thrust receiving member 46 is inserted into the recessed part 45 in a state that the second thrust receiving member 46 is abutted with a pair of the side faces 45c of the recessed part 45 of the case 50. As a result, the second supporting point part 42 is positioned in the circumferential direction around the optical axis "L". Further, the second plate part 462 of the second thrust receiving member 46 is abutted with the bottom face 45a of the recessed part 45 and thereby, the second supporting point part 42 is positioned in the "Z"-axis direction. In addition, the second thrust receiving member 46 is fixed to the case 50 with an adhesive which is applied to the first groove 45d and the second groove 45e. When a state that the second thrust receiving member 46 has been fixed to the case 50 is viewed in the second axis "R2" direction, the second fixing hole 463 is overlapped with the second groove 45e.

When the gimbal frame 9 and the fixed body 5 are to be connected with each other, as shown in FIG. 4, the second support part extended parts 94 of the gimbal frame 9 are inserted between the holder frame 30 and the case 50 on both sides in the second axis "R2" direction of the movable body 3 (holder frame 30). As a result, as shown in FIG. 12, the second support part 902 provided in the second support part extended part 94 and the first plate part 461 of the second thrust receiving member 46 fixed to the fixed body 5 are faced each other. Next, the second spherical body 464 fixed to the first plate part 461 is inserted into the second concave curved face 902a to bring the second spherical body 464 and the second support part 902 into point contact with each other. In parallel therewith, a pair of the third plate parts 465 of the second thrust receiving member 46 is inserted into a pair of the second cut-out recessed parts 94a of the second support part extended part 94. In this manner, the second connection mechanism 48 is structured. In this case, when the second spherical body 464 and the second support part 902 are contacted with each other, the second support part extended part 94 is resiliently bent and the second support part 902 is elastically contacted with the second spherical body 464. Therefore, the second spherical body 464 is hard to be disengaged from the second support part 902. Further, in a state that the second connection mechanism 48 is structured, the second plate part 462 of the second thrust receiving member 46 and the second support part extended part 94 are faced each other with a space interposed therebetween in the "Z"-axis direction.

(Operations and Effects)

In the optical unit 1 with a shake correction function in this embodiment, the gimbal mechanism 4 includes the first connection mechanism 47 structured to turnably connect the movable body 3 with the gimbal frame 9 around the first axis "R1". The first connection mechanism 47 includes the first spherical body 444, the first spherical body fixing part 101 of the movable body 3 where the first spherical body 444 is fixed, and the first support part 901 of the gimbal frame 9 having the first concave curved face 901a which faces the first spherical body fixing part 101 and contacts with the first spherical body 444. Further, the first spherical body fixing part 101 is provided with the first fixing hole 443 to which the first spherical body 444 is partly fitted. Therefore, when the first spherical body 444 is placed on the first fixing hole 443 provided in the first spherical body fixing part 101, the first spherical body 444 can be positioned in the first spherical body fixing part 101. Accordingly, when the gimbal frame 9 and the movable body 3 are to be turnably connected with each other by using the first spherical body 444, the first spherical body 444 can be positioned and fixed with a high degree of accuracy.

Further, the gimbal mechanism 4 includes the second connection mechanism 48 structured to turnably connect the fixed body 5 with the gimbal frame 9 around the second axis "R2". The second connection mechanism 48 includes the second spherical body 464, the second spherical body fixing part 104 of the fixed body 5 where the second spherical body 464 is fixed, and the second support part 902 of the gimbal frame 9 having the second concave curved face 902a which faces the first spherical body fixing part 101 and contacts with the second spherical body 464. The second spherical body fixing part 104 is provided with the second fixing hole 463 to which the second spherical body 464 is partly fitted. Therefore, when the second spherical body 464 is placed on the second fixing hole 463 provided in the second spherical body fixing part 104, the second spherical body 464 can be positioned in the second spherical body fixing part 104. Accordingly, when the gimbal frame 9 and the fixed body 5 are to be turnably connected with each other by using the second spherical body 464, the second spherical body 464 can be positioned and fixed with a high degree of accuracy.

In addition, in the movable body 3 in this embodiment, the first fixing hole 443 is provided in the first thrust receiving member 44 which is separately provided from the holder frame 30 and thus, the first fixing hole 443 is easily formed.

Further, the first spherical body 444 is fixed to the first fixing hole 443 which is provided in the first thrust receiving member 44 separately provided from the holder frame 30 and thus, the first spherical body 444 is easily fixed to the movable body 3. In addition, in the fixed body 5 in this embodiment, the second fixing hole 463 is provided in the second thrust receiving member 46 which is separately provided from the case 50 and thus, the second fixing hole 463 is easily formed. Further, the second spherical body 464 is fixed to the second fixing hole 433 which is provided in the second thrust receiving member 46 separately provided from the case 50 and thus, the second spherical body 464 is easily fixed to the fixed body 5.

Further, in this embodiment, the first spherical body 444 and the first thrust receiving member 44 are made of metal, and a first welded mark 102 which fixes the first spherical body 444 to the first thrust receiving member 44 is left and provided in a boundary portion between the first spherical body 444 and the inner wall face of the first fixing hole 443 of the first thrust receiving member 44. Therefore, the first spherical body 444 and the first thrust receiving member 44 are fixed to each other by welding. Accordingly, in comparison with a case that the first spherical body 444 and the first thrust receiving member 44 are fixed to each other with an adhesive, the first spherical body 444 and the first thrust receiving member 44 are fixed to each other surely. Further, an adhesive does not stick to the first spherical body 444 and the first thrust receiving member 44 and thus, relative turning of the gimbal frame 9 to the movable body 3 is not obstructed by the adhesive. Similarly, the second spherical body 464 and the second thrust receiving member 46 are made of metal, and a second welded mark 105 which fixes the second spherical body 464 to the second thrust receiving member 46 is left and provided in a boundary portion between the second spherical body 464 and the inner wall face of the second fixing hole 463 of the second thrust receiving member 46. Therefore, the second spherical body 464 and the second thrust receiving member 46 are fixed to each other by welding. Accordingly, in comparison with a case that the second spherical body 464 and the second thrust receiving member 46 are fixed to each other with an adhesive, the second spherical body 464 and the second thrust receiving member 46 are surely fixed to each other. Further, an adhesive does not stick to the second spherical body 464 and the second thrust receiving member 46 and thus, relative turning of the gimbal frame 9 to the fixed body 5 is not obstructed by the adhesive.

Further, in this embodiment, the first spherical body 444 and the first thrust receiving member 44 can be welded by irradiating an inside of the first fixing hole 443 with a laser beam. Therefore, the first spherical body 444 is easily fixed to the first thrust receiving member 44. Similarly, the second spherical body 464 and the second thrust receiving member 46 can be welded by irradiating an inside of the second fixing hole 463 with a laser beam. Therefore, the second spherical body 464 is easily fixed to the second thrust receiving member 46.

In addition, the first thrust receiving member 44 is provided with sagging 443a at an opening edge of the first fixing hole 443 on an opposite side to a side where the first spherical body 444 is fixed. In other words, the first fixing hole 443 can be formed by punching the first thrust receiving member 44. In this case, when the sagging 443a is formed, the opening edge of the first fixing hole 443 on an opposite side to a side where the first spherical body 444 is fixed is formed so as to be enlarged in diameter to an outer side toward the opening end. As a result, the inside of the first fixing hole 443 is easily irradiated with a laser beam and thus, the first spherical body 444 and the first thrust receiving member 44 are welded easily. Further, the second thrust receiving member 46 is provided with sagging 463a at an opening edge of the second fixing hole 463 on an opposite side to a side where the second spherical body 464 is fixed. In other words, the second fixing hole 463 can be formed by punching the second thrust receiving member 44. In this case, when the sagging 463a is formed, the opening edge of the second fixing hole 463 on an opposite side to a side where the second spherical body 464 is fixed is formed so as to be enlarged in diameter to an outer side toward the opening end. As a result, the inside of the second fixing hole 463 is easily irradiated with a laser beam and thus, the second spherical body 464 and the second thrust receiving member 46 are welded easily.

Further, in this embodiment, an end of the first spherical body 444 on an opposite side to the first support part 901 in the first axis "R1" direction is located on an inner side of the first fixing hole 443. As a result, the first spherical body 444 does not protrude from an end face of the first thrust receiving member 44 on an opposite side to the first support part 901. Therefore, when the first thrust receiving member 44 is to be fixed to the holder frame 30, the first spherical body 444 is prevented from contacting with the holder frame 30 and prevented from being disengaged. Similarly, an end of the second spherical body 464 on an opposite side to the second support part 902 in the second axis "R2" direction is located on an inner side of the second fixing hole 463. Therefore, the second spherical body 464 does not protrude from an end face of the second thrust receiving member 46 on an opposite side to the second support part 902. Accordingly, when the second thrust receiving member 46 is to be fixed to the case 50, the second spherical body 464 is prevented from contacting with the case 50 and prevented from being disengaged.

In addition, the gimbal frame 9 is provided with a pair of the first support part extended parts 93 which are extended in the optical axis "L" direction between the optical module 2 and the holder frame 30 on both sides in the first axis "R1" direction of the optical module 2, a pair of the second support part extended parts 94 which are extended in the "Z"-axis direction between the holder frame 30 and the case 50 on both sides in the second axis "R2" direction of the holder frame 30, and the first frame portion 91 which connects ends on one side in the "Z"-axis direction of the first support part extended parts 93 with ends on the one side in the "Z"-axis direction of the second support part extended parts 94. The first connection mechanism 47 includes the first support part 901 which is provided in each of a pair of the first support part extended parts 93, the first spherical body fixing part 101 which is provided in the holder frame 30 at a position facing each of the first support part extended parts 93 in the first axis "R1" direction, and the first spherical body 444 which is fixed to each of the first spherical body fixing parts 101. The second connection mechanism 48 includes the second support part 902 which is provided in each of a pair of the second support part extended parts 94, the second spherical body fixing part 104 which is provided in the case 50 at a position facing each of the second support part extended parts 94 in the second axis "R2" direction, and the second spherical body 464 which is fixed to each of the second spherical body fixing parts 104. Therefore, the movable body 3 can be turnably supported around the first axis "R1" and around the second axis "R2".

Further, the first thrust receiving member 44 is provided with the first plate part 441 having the first fixing hole 443 and the second plate part 442 which is bent from an end in the "−Z" direction of the first plate part 441 toward a side of the first support part 901 in the first axis "R1" direction. The second plate part 442 faces the first support part extended part 93 of the gimbal frame 9 in the "Z"-axis direction with a space interposed therebetween. Further, the second thrust receiving member 46 is provided with the first plate part 461 having the second fixing hole 463 and the second plate part 462 which is bent from an end in the "−Z" direction of the first plate part 461 toward a side of the second support part 902 in the second axis "R2" direction. The second plate part 462 faces the second support part extended part 94 of the gimbal frame 9 in the "Z"-axis direction with a space interposed therebetween. Therefore, in a case that the first spherical body 444 is disengaged from the first support part 901 of the gimbal frame 9 and the gimbal frame 9 is moved to the "−Z" direction, the second plate part 442 is abutted with the first support part extended part 93 and thus, the gimbal frame 9 can be prevented from further moving to the "−Z" direction. Further, in a case that the second spherical body 464 is disengaged from the second support part 902 of the gimbal frame 9 and the gimbal frame 9 is moved to the "−Z" direction, the second plate part 462 is abutted with the second support part extended part 94 and thus, the gimbal frame 9 can be prevented from further moving to the "−Z" direction.

Further, the first support part extended part 93 is provided with the first cut-out recessed parts 93a, which are recessed in an orthogonal direction perpendicular to the "Z"-axis direction and the first axis "R1" direction, on the "+Z" direction side with respect to the first support part 901. The first thrust receiving member 44 is provided with the third plate parts 445 which are bent from ends in the orthogonal direction of the first plate part 441 to a side of the first support part 901 in the first axis "R1" direction and are inserted into the first cut-out recessed parts 93a. Therefore, in a case that the first spherical body 444 is disengaged from the first support part 901 of the gimbal frame 9 and the gimbal frame 9 is moved in the "Z"-axis direction, the third plate part 445 is abutted with an opening edge of the first cut-out recessed part 93a in the first support part extended part 93 and thus, the gimbal frame 9 is prevented from further moving in the "Z"-axis direction. Similarly, the second support part extended part 94 is provided with the second cut-out recessed parts 94a, which are recessed in an orthogonal direction perpendicular to the "Z"-axis direction and the second axis "R2" direction, on the "+Z" direction side with respect to the second support part 902. The second thrust receiving member 46 is provided with the third plate parts 465 which are bent from ends in the orthogonal direction of the first plate part 461 to a side of the second support part 902 in the second axis "R2" direction and are inserted into the second cut-out recessed parts 94a. Therefore, in a case that the second spherical body 464 is disengaged from the second support part 902 of the gimbal frame 9 and the gimbal frame 9 is moved in the "Z"-axis direction, the third plate part 465 is abutted with an opening edge of the second cut-out recessed part 94a in the second support part extended part 94 and thus, the gimbal frame 9 is prevented from further moving in the "Z"-axis direction.

Further, the first thrust receiving member 44 is provided with the second plate part 442 and a pair of the third plate parts 445 which are protruded to a side of the first spherical body 444 on both sides in the "Z" direction of the first spherical body fixing part 101 and thus, in a case that a component in a state that the first spherical body 444 has been fixed to the first thrust receiving member 44 is moved or the like, the first spherical body 444 can be prevented from contacting with an external member and from being dropped. Similarly, when the second thrust receiving member 46 is provided with the second plate part 462 and a pair of the third plate parts 465 which are protruded to a side of the second spherical body 464 on both sides in the "Z" direction of the second spherical body fixing part 104, in a case that a component in a state that the second spherical body 464 has been fixed to the second thrust receiving member 46 is moved or the like, the second spherical body 464 can be prevented from contacting with an external member and from being dropped.

Other Embodiments

The first spherical body 444 and the second spherical body 464 may be provided in the gimbal frame 9. In this case, the gimbal frame 9 is provided with the first spherical body fixing parts 101 and the second spherical body fixing parts 104, and the movable body 3 is provided with the first support parts 901, and the fixed body 5 is provided with the second support parts 902. For example, the first support part 901 is provided in the first thrust receiving member 44 of the movable body 3, and the second support part 902 is provided in the second thrust receiving member 46 of the fixed body.

While the description above refers to particular embodiments of the present disclosure, it will be understood that many modifications may be made without departing from the spirit thereof. The accompanying claims are intended to cover such modifications as would fall within the true scope and spirit of the present disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body comprising an optical module;
    a gimbal mechanism structured to swingably support the movable body around a first axis intersecting an optical axis and swingably support the movable body around a second axis intersecting the optical axis and the first axis;
    a fixed body which supports the movable body through the gimbal mechanism; and
    a magnetic drive mechanism structured to swing the movable body around the first axis and around the second axis;
    wherein the gimbal mechanism comprises:
        a gimbal frame;
        a first connection mechanism structured to turnably connect the movable body with the gimbal frame around the first axis; and
        a second connection mechanism structured to turnably connect the fixed body with the gimbal frame around the second axis;
    wherein the first connection mechanism comprises:
        a first spherical body;
        a first spherical body fixing part to which the first spherical body is fixed in one of the movable body and the gimbal frame; and
        a first spherical body support part comprising a first concave curved face which faces the first spherical body fixing part and contacts with the first spherical body in an other of the movable body and the gimbal frame; and wherein the first spherical body fixing part comprises a first fixing hole to which the first spherical body is partly fitted, and the first fixing hole is smaller in diameter than the first spherical body, wherein the second connection mechanism comprises:
a second spherical body;
a second spherical body fixing part to which the second spherical body is fixed in one of the fixed body and the gimbal frame; and
a second spherical body support part comprising a second concave curved face which faces the second spherical body fixing part and contacts with the second spherical body in an other of the fixed body and the gimbal frame;

wherein the second spherical body fixing part comprises a second fixing hole to which the second spherical body is partly fitted, wherein the movable body comprises:
a movable body frame which surrounds the optical module from an outer peripheral side; and
a first thrust receiving member which is fixed to the movable body frame at a position overlapped with the first axis, wherein the first thrust receiving member comprises the first spherical body fixing part, and the gimbal frame comprises the first spherical body support part, wherein the fixed body comprises:
a fixed body frame which surrounds the movable body frame from an outer peripheral side; and
a second thrust receiving member which is fixed to the fixed body frame at a position overlapped with the second axis, wherein the second thrust receiving member comprises the second spherical body fixing part, and the gimbal frame comprises the second spherical body support part.

2. The optical unit with a shake correction function according to claim 1, wherein
the first spherical body, the first thrust receiving member, the second spherical body and the second thrust receiving member are made of metal,
the first fixing hole is penetrated through the first thrust receiving member in a direction of the first axis,
the second fixing hole is penetrated through the second thrust receiving member in a direction of the second axis,
a boundary portion between the first spherical body and an inner wall face of the first fixing hole of the first thrust receiving member comprises a first welded mark which fixes the first spherical body to the first thrust receiving member, and
a boundary portion between the second spherical body and an inner wall face of the second fixing hole of the second thrust receiving member comprises a second welded mark which fixes the second spherical body to the second thrust receiving member.

3. The optical unit with a shake correction function according to claim 2, wherein
the first thrust receiving member comprises sagging at an opening edge of the first fixing hole on an opposite side to a side where the first spherical body is fixed, and the second thrust receiving member comprises sagging at an opening edge of the second fixing hole on an opposite side to a side where the second spherical body is fixed.

4. The optical unit with a shake correction function according to claim 1, wherein
an end of the first spherical body on an opposite side to the first spherical body support part in a direction of the first axis is located on an inner side of the first fixing hole, and
an end of the second spherical body on an opposite side to the second spherical body support part in a direction of the second axis is located on an inner side of the second fixing hole.

5. The optical unit with a shake correction function according to claim 1, wherein
the gimbal frame comprises:
a pair of first support part extended parts which are extended in a direction of the optical axis between the optical module and the movable body frame on both sides in a direction of the first axis of the optical module;
a pair of second support part extended parts which are extended in the direction of the optical axis between the movable body frame and the fixed body frame on both sides in a direction of the second axis of the movable body fame; and
a connection frame part which connects ends on one side in the direction of the optical axis of the first support part extended parts with ends on the one side in the direction of the optical axis of the second support part extended parts, the first connection mechanism comprises:
the first spherical body support part which is provided in each of the pair of the first support part extended parts;
the first spherical body fixing part which is provided in the movable body frame at a position facing each of the first support part extended parts in the direction of the first axis; and
the first spherical body which is fixed to each of the first spherical body fixing parts, and
the second connection mechanism comprises:
the second spherical body support part which is provided in each of the pair of the second support part extended parts;
the second spherical body fixing part which is provided in the fixed body frame at a position facing each of the second support part extended parts in the direction of the second axis; and
the second spherical body which is fixed to each of the second spherical body fixing parts.

6. The optical unit with a shake correction function according to claim 5, wherein
the first thrust receiving member comprises:
a first facing part which faces the first spherical body support part and comprises the first fixing hole; and
a first bent part which is bent from an end of the first facing part on an other side in the direction of the optical axis toward a side of the first spherical body support part in the direction of the first axis,
the first bent part faces the first support part extended part in the direction of the optical axis with a space interposed therebetween, the second thrust receiving member comprises:
- a second facing part which faces the second spherical body support part and comprises the second fixing hole; and
- a second bent part which is bent from an end of the second facing part on the other side in the direction of the optical axis toward a side of the second spherical body support part in the direction of the second axis, and the second bent part faces the second support part extended part in the direction of the optical axis with a space interposed therebetween.

7. The optical unit with a shake correction function according to claim 6, wherein
- the first support part extended part comprises a first cut-out recessed part which is recessed in an orthogonal direction perpendicular to the direction of the optical axis and the direction of the first axis on the one side in the direction of the optical axis of the first spherical body support part,
- the first thrust receiving member comprises a first insertion part which is bent from an end in the orthogonal direction of the first facing part toward a side of the first spherical body support part in the direction of the first axis and is inserted into the first cut-out recessed part,
- the second support part extended part comprises a second cut-out recessed part which is recessed in the orthogonal direction on the one side in the direction of the optical axis of the second spherical body support part, and
- the second thrust receiving member comprises a second insertion part which is bent from an end in the orthogonal direction of the second facing part toward a side of the second spherical body support part in the direction of the second axis and is inserted into the second cut-out recessed part.

* * * * *